US006714483B2

(12) United States Patent
Minami et al.

(10) Patent No.: US 6,714,483 B2
(45) Date of Patent: Mar. 30, 2004

(54) INCLINATION ANGLE MEASUREMENT APPARATUS

(75) Inventors: Fumihiro Minami, Tokyo (JP); Takashi Ohsawa, Tokyo (JP); Yoshio Katayama, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/358,223

(22) Filed: Feb. 5, 2003

(65) Prior Publication Data

US 2003/0156585 A1 Aug. 21, 2003

(30) Foreign Application Priority Data

Feb. 15, 2002 (JP) .......................... 2002-38808
Oct. 28, 2002 (JP) ........................ 2002-313135

(51) Int. Cl.[7] ............................................. G01S 15/88
(52) U.S. Cl. ....................................................... 367/125
(58) Field of Search .......................... 367/96, 99, 188, 367/87, 125; 315/82; 342/61, 72

(56) References Cited

U.S. PATENT DOCUMENTS

| 4,722,547 | A | * | 2/1988 | Kishi et al. ............. 367/96 |
| 4,754,440 | A | * | 6/1988 | Naruse .................. 367/188 |
| 6,130,506 | A | * | 10/2000 | Lopez et al. ............ 315/82 |

FOREIGN PATENT DOCUMENTS

| JP | 3-58218295 A | * | 12/1983 | ............ H04R/1/32 |
| JP | 3-61172080 A | * | 8/1986 | ............ G01S/7/52 |
| JP | 4-10181428 A | * | 7/1998 | ............ B60Q/1/115 |

* cited by examiner

Primary Examiner—Daniel T. Pihulic
(74) Attorney, Agent, or Firm—Sughrue Mion, PLLC

(57) ABSTRACT

An inclination angle measurement apparatus includes a first ultrasonic sensor (3) for sending an ultrasonic wave toward a road surface (2), second and third ultrasonic sensors (4 and 5) each for receiving an ultrasonic wave reflected from the road surface (2), and a calculation control circuit (14) for calculating an angle of inclination of a vehicle with respect to the road surface (2) based on a phase difference between ultrasonic waves received by the second and third ultrasonic sensors (4 and 5). Thus the inclination angle measurement apparatus can accurately measure the angle of inclination of the vehicle with respect to the road surface (2).

34 Claims, 18 Drawing Sheets

ROAD SURFACE

ROAD SURFACE

REFLECTED WAVE A

REFLECTED WAVE B

RECEIVED WAVE

TRANSMITTED WAVE

REFLECTED WAVE

RECEIVED WAVE

INCLINATION ANGLE MEASUREMENT APPARATUS

BACKGROUND OF THE INVENTION

1. Field of the Invention

The present invention relates to an inclination angle measurement apparatus that sends a wave toward a road surface, and measures an angle of inclination of a vehicle with respect to the road surface based on a phase difference between the phases of received waves reflected from the road surface.

2. Description of Related Art

As an apparatus associated with such an inclination angle measurement apparatus, there has been provided an apparatus for automatically adjusting the distance of illumination of a vehicle-mounted projector. This apparatus is provided with an element for outputting a voltage that is a function of the position of the projector, a detector including two sonars disposed at front and rear sides of the vehicle's body, respectively, and a transducer for outputting a voltage indicating a phase difference between two reflected waves detected by the two sonars, and a comparator for comparing the voltage from the element with that from the detector, and for transmitting an algebraic difference between the two voltages to a driving device for driving an electromechanical system for controlling the angle of inclination of the projector. The detector simultaneously emits two acoustic waves toward a road surface on which the vehicle is traveling by using the two sonars so as to effectively define a difference between the distance between the front side of the vehicle and the road surface and the distance between the rear side of the vehicle and the road surface, detects the heads of the two acoustic waves reflected from the road surface, and then determines the phase difference between the heads of the two acoustic waves and delivers a voltage indicating the phase difference by using the transducer (see Japanese patent application publication (TOKKAISHO) No.56-8727 (line 6 of first column to line 1 of second column and FIGS. 1 and 2), for example).

While the detector of the prior art apparatus determines the phase difference, i.e. time difference between the head of the reflected acoustic wave detected by one of the two sonars and that of the reflected acoustic wave detected by the other sonar and delivers it as the difference between the distance between the front side of the vehicle and the road surface and the distance between the rear side of the vehicle and the road surface, the detector cannot accurately determine the times at which it starts receiving the two reflected acoustic waves, respectively, because each of them has small energy and a long rising time.

SUMMARY OF THE INVENTION

The present invention is proposed to solve the above-mentioned problem, and it is therefore an object of the present invention to provide an inclination angle measurement apparatus that can accurately measure an angle of inclination of a vehicle with respect to a road surface based on a phase difference between the phases of received waves.

In accordance with the present invention, there is provided an inclination angle measurement apparatus including a sending/receiving unit for sending a wave toward a road surface and for receiving two waves reflected from the road surface, and an inclination angle calculating unit for calculating an angle of inclination of a vehicle with respect to the road surface based on a phase difference between the phases of the two reflected waves.

As a result, the inclination angle measurement apparatus in accordance with the present invention can accurately measure the angle of inclination of the vehicle with respect to the road surface based on the phase difference between the received waves.

Further objects and advantages of the present invention will be apparent from the following description of the preferred embodiments of the invention as illustrated in the accompanying drawings.

DETAILED DESCRIPTION OF THE PREFERRED EMBODIMENTS

The invention will now be described with reference to the accompanying drawings.

Embodiment 1.

Figure 1:
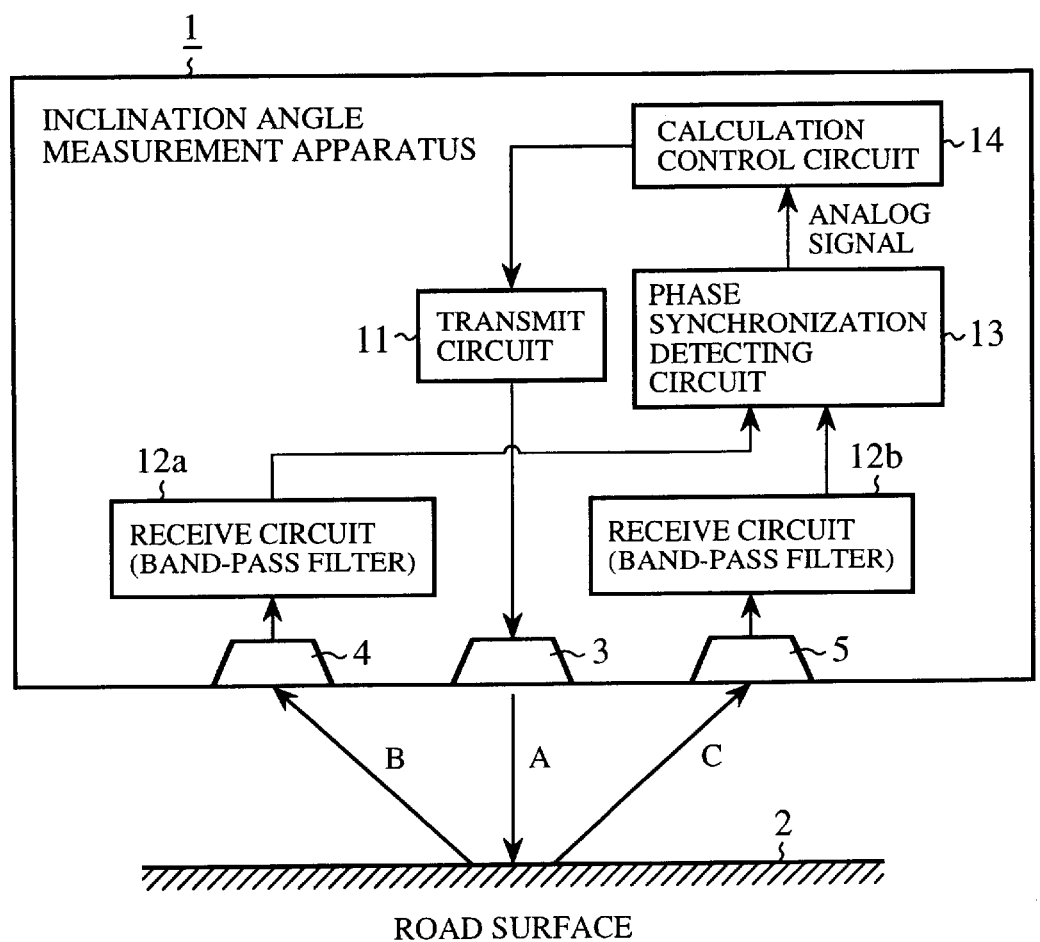
FIG. 1 is a block diagram showing the structure of an inclination angle measurement apparatus according to embodiment 1 of the present invention.

FIG. 1 is a block diagram showing an inclination angle measurement apparatus according to embodiment 1 of the present invention. In the figure, reference numeral 1 denotes the inclination angle measurement apparatus that is mounted on a lower surface of a vehicle so that it is parallel to the lower surface of the vehicle, and reference numeral 2 denotes a road surface.

Figure 2:
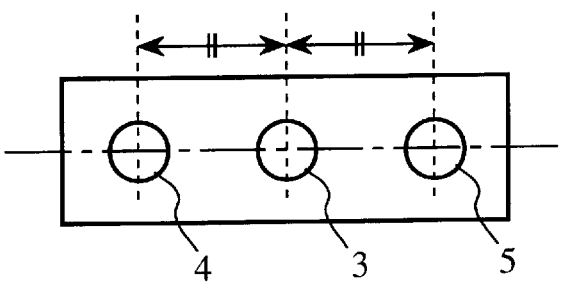
FIG. 2 is a bottom plan view of the inclination angle measurement apparatus according to embodiment 1 and shows the placement of ultrasonic sensors.

FIG. 2 is a bottom plan view of the inclination angle measurement apparatus and shows the placement of first to third ultrasonic sensors 3 to 5 included in the inclination angle measurement apparatus. Each of these ultrasonic sensors 3 to 5 can convert an electric fixed-frequency pulse train into an ultrasonic wave, and vice versa. In other words, each of these ultrasonic sensors 3 to 5 can send and receive an ultrasonic wave. In accordance with this embodiment 1, the first ultrasonic sensor 3 serves as an ultrasonic sensor for sending an ultrasonic wave toward the road surface 2, and each of the second and third ultrasonic sensors 4 and 5 serves as an ultrasonic sensor for receiving an ultrasonic wave reflected from the road surface 2. The first to third ultrasonic sensors 3 to 5 are arranged in a line along the length of the vehicle and are spaced at regular intervals.

In FIG. 1, reference numeral 11 denotes a transmit circuit for generating a fixed-frequency pulse train and for delivering it to the first ultrasonic sensor 3, reference numerals 12a and 12b denote receive circuits (band-pass filters) for respectively extracting fixed-frequency components from electric pulse trains that are generated from ultrasonic waves reflected from the road surface 2 by the second and third ultrasonic sensors 4 and 5, reference numeral 13 denotes a phase synchronization detecting circuit for comparing the waveforms of the fixed-frequency components extracted by the receive circuits 12a and 12b with each other so as to generate a phase difference between the fixed-frequency components, and reference numeral 14 denotes a calculation control circuit (inclination angle calculating means) for calculating an angle of inclination of the vehicle with respect to the road surface 2 based on the phase difference from the phase synchronization detecting circuit 13, and for controlling the entire inclination angle measurement apparatus 1.

Next, a description will be made as to an operation of the inclination angle measurement apparatus according to embodiment 1 of the present invention. The transmit circuit 11 shown in FIG. 1 generates a fixed-frequency pulse train according to an instruction from the calculation control circuit 14 and delivers it to the first ultrasonic sensor 3. The first ultrasonic sensor 3 converts the electric signal acquired from the transmit circuit 11 into vibrational energy so as to send an ultrasonic wave A toward the road surface 2.

The ultrasonic wave A hits the road surface 2 and is reflected from the road surface 2, and the second and third ultrasonic sensors 4 and 5 receive two ultrasonic waves B and C reflected from the road surface 2 and generate electric pulse signals having frequencies corresponding to the two ultrasonic waves B and C, respectively. The receive circuits 12a and 12b constitute band-pass filters, respectively, remove unnecessary frequency components from pulse trains generated by the second and third ultrasonic sensors 4 and 5, respectively, so as to extract only components having a frequency equal to that of the fixed-frequency pulse train used to generate the ultrasonic wave A, and transmit them to the phase synchronization detecting circuit 13, respectively. The phase synchronization detecting circuit 13 compares the waveforms of the fixed-frequency pulse trains respectively extracted by the receive circuit 12a and 12b with each other. The reflected ultrasonic wave received by each of the second and third ultrasonic sensors 4 and 5 has inadequate energy and a waveform of small amplitude immediately after received. Therefore, the phase synchronization detecting circuit 13 may not be able to recognize the waveforms of the two reflected ultrasonic waves immediately after the second and third ultrasonic sensors 4 and 5 start receiving the two reflected ultrasonic waves, respectively. Therefore, after the two reflected ultrasonic waves have adequate signal levels, the phase synchronization detecting circuit 13 compares the waveforms of the fixed-frequency pulse trains respectively extracted by the receive circuit 12a and 12b with each other.

Because the second and third ultrasonic sensors 4 and 5 simultaneously receive the two ultrasonic waves B and C reflected from the road surface 2 when the vehicle is parallel to the road surface 2, the two ultrasonic waves B and C are in phase with each other. In contrast, when the vehicle's front side goes down toward the road surface 2, that is, when the vehicle's front side is inclined toward the road surface 2, the second ultrasonic sensor 4 receives the reflected ultrasonic wave B earlier than the ultrasonic sensor 5 receives the reflected ultrasonic wave C. In other words, the phase of the ultrasonic wave B received by the second ultrasonic sensor 4 leads the phase of the ultrasonic wave C received by the third ultrasonic sensor 5. Oppositely, when the vehicle's rear side goes down toward the road surface 2, that is, when the vehicle's rear side is inclined toward the road surface 2, the second ultrasonic sensor 4 receives the reflected wave B later than the third ultrasonic sensor 5 receives the reflected wave C. In other words, the phase of the ultrasonic wave B received by the second ultrasonic sensor 4 lags the phase of the ultrasonic wave C received by the third ultrasonic sensor 5. The phase synchronization detecting circuit 13 determines the phase difference between the phases of the ultrasonic waves B and C, converts this phase difference into an equivalent analog value, and delivers the analog value to the calculation control circuit 14. The calculation control circuit 14 calculates the angle of inclination of the vehicle with respect to the road surface 2 from the phase difference, the propagation velocity of the ultrasonic wave sent by the first ultrasonic sensor 3, and the distance between the second ultrasonic sensor 4 and the third ultrasonic sensor 5. For example, the calculated inclination angle is used for adjustment (auto levelizer) of the optical axis of the headlight of the vehicle and control of the strength of the suspension of the vehicle.

Figure 3:
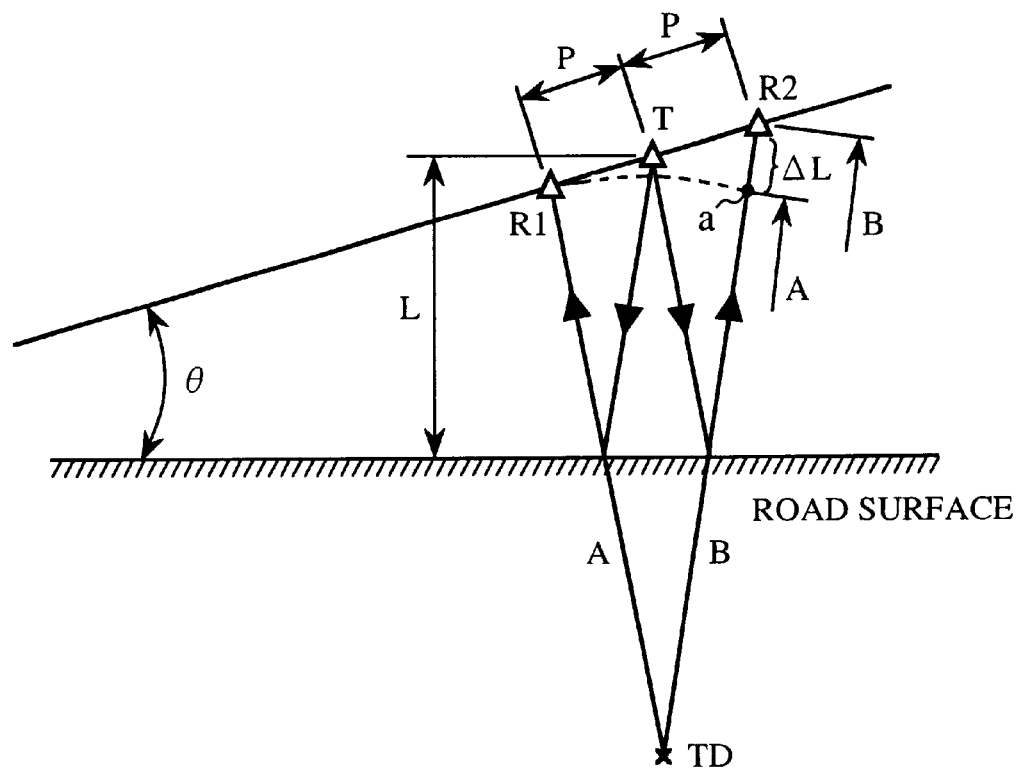
FIG. 3 is an explanatory drawing showing the principle of the inclination angle measurement apparatus according to embodiment 1 of the present invention.
Figure 4:
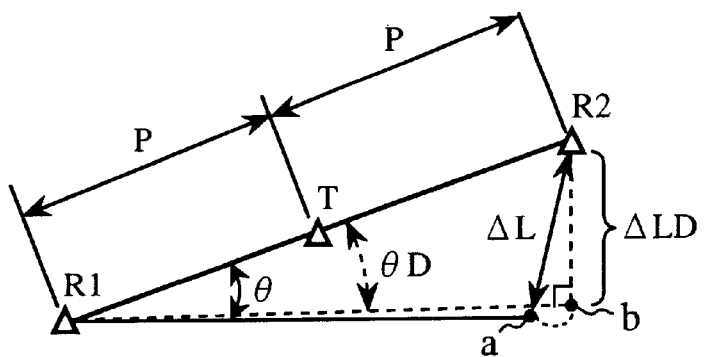
FIG. 4 is an explanatory drawing showing a part of FIG. 3 in detail.

Next, the principle underling the measurement of the angle of inclination by using the three ultrasonic sensors 3 to 5 will be explained. FIG. 3 is an explanatory drawing showing the principle of the inclination angle measurement apparatus according to embodiment 1 of the present invention. In the figure, T denotes a position of the first ultrasonic sensor 3 for sending an ultrasonic wave toward the road surface 2, R1 denotes a position of the second ultrasonic sensor 4 for receiving an ultrasonic wave reflected from the road surface 2, R2 denotes a position of the third ultrasonic sensor 5 for receiving an ultrasonic wave reflected from the road surface 2, TD denotes a virtual image point of the first ultrasonic sensor 3, A denotes the distance between R1 and TD, B denotes the distance between R2 and TD, a denotes a point having a distance from TD, which is equal to A, and located on the line segment between R2 and TD, $\Delta L$ denotes the length of a line segment between R2 and a, P denotes the distance (sensor pitch) between R1 and T and the distance (sensor pitch) between R2 and T, L denotes a height of the lower surface of the vehicle, $\theta$ denotes the angle of inclination of the lower surface of the vehicle with respect to the road surface. FIG. 4 is an explanatory drawing showing a part of FIG. 3 in detail.

If $2P \gg \Delta L$, the triangle R1 R2 a can be assumed to be congruent to the right-angled triangle R1 R2 b, as can be seen from FIG. 4. Therefore, it can be assumed that the angle of inclination $\theta$ is equal to an angle $\theta D$ formed by two sides at the vertex R1 of the right-angled triangle R1 R2 b. The distance A is equivalent to the length of a path running from the position T to the position R1, along which the ultrasonic wave sent by the first ultrasonic sensor 3 travels to the second ultrasonic sensor 4, and the distance B is equivalent to the length of a path running from the position T to the position R2, along which the ultrasonic wave sent by the first ultrasonic sensor 3 travels to the third ultrasonic sensor 5. The difference between the distance B and the distance A, i.e., the distance $\Delta L$ is calculated from the phase difference delivered from the phase synchronization detecting circuit 13, and the propagation velocity of the ultrasonic wave sent by the first ultrasonic sensor 3.

Therefore, sin $\theta D$ is equal to $\Delta LD/2P$, and it can be assumed that sin $\theta = \Delta L/2P$ if $2P \gg \Delta L$. Thus the angle of inclination $\theta$ can be calculated from the phase difference delivered from the phase synchronization detecting circuit 13, the propagation velocity of the ultrasonic wave sent by the first ultrasonic sensor 3, and the sensor pitch.

As mentioned above, in accordance with this embodiment 1, the inclination angle measurement apparatus can accurately measure an angle of inclination of a vehicle with respect to a road surface based on a phase difference between the phases of received ultrasonic waves by using the first ultrasonic sensor 3 for sending an ultrasonic wave toward the road surface, and the second and third ultrasonic sensors 4 and 5 each for receiving an ultrasonic wave reflected from the road surface.

Embodiment 2.

Figure 5:
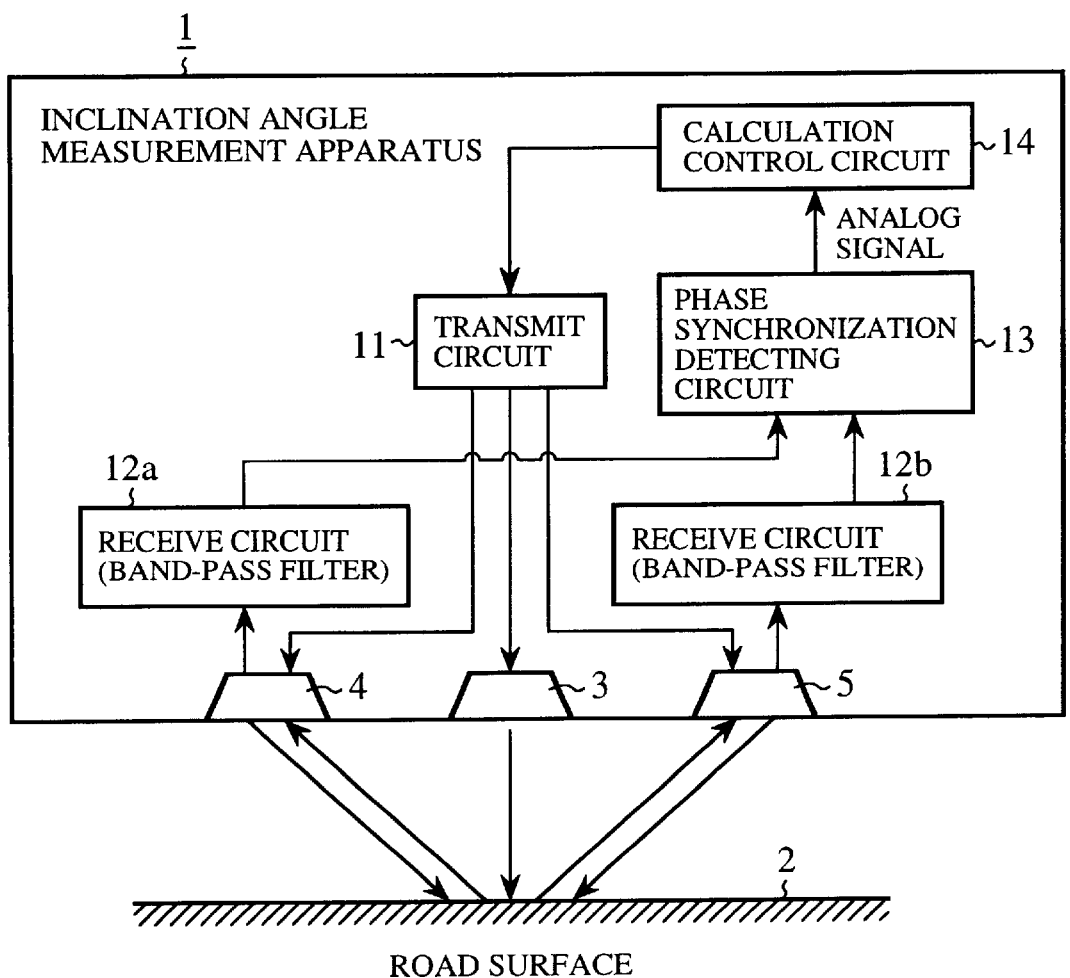
FIG. 5 is a block diagram showing the structure of an inclination angle measurement apparatus according to embodiment 2 of the present invention.

FIG. 5 is a block diagram showing the structure of an inclination angle measurement apparatus according to embodiment 2 of the present invention. In addition to a first ultrasonic sensor 3 for sending an ultrasonic wave toward a road surface, the inclination angle measurement apparatus according to embodiment 2 is provided with second and third ultrasonic sensors 4 and 5 each for sending an ultrasonic wave toward the road surface and for receiving an ultrasonic wave reflected from the road surface, and a transmit circuit 11 for transmitting a fixed-frequency pulse train to the first to third ultrasonic sensors 3 to 5. The other components included in the inclination angle measurement apparatus according to embodiment 2 are the same as those of the inclination angle measurement apparatus according to embodiment 1 shown in FIG. 1, with the exception that a calculation control circuit 14 has a calculating function different from that of the calculation control circuit 14 of the inclination angle measurement apparatus according to embodiment 1.

Next, a description will be made as to an operation of the inclination angle measurement apparatus according to embodiment 2 of the present invention. As mentioned above, in accordance with above-mentioned embodiment 1, the inclination angle measurement apparatus measures an angle of inclination of a vehicle with respect to a road surface based on a phase difference between the phases of received ultrasonic waves by using the first ultrasonic sensor 3 for sending an ultrasonic wave toward the road surface, and the second and third ultrasonic sensors 4 and 5 each for receiving an ultrasonic wave reflected from the road surface. However, when the vehicle is traveling and a wind is flowing between the three ultrasonic sensors 3 to 5 and the road surface, there is a possibility that an error occurs in the calculated angle of inclination because the length of a path along which the ultrasonic wave actually travels from the first ultrasonic sensor 3 to the second ultrasonic sensor 4 differs from that of a path along which the ultrasonic wave actually travels from the first ultrasonic sensor 3 to the third ultrasonic sensor 5. The inclination angle measurement apparatus according to embodiment 2 can make a correction to an error that occurs in the calculated angle of inclination due to a wind flowing between the three ultrasonic sensors 3 to 5 and the road surface.

Figure 6:
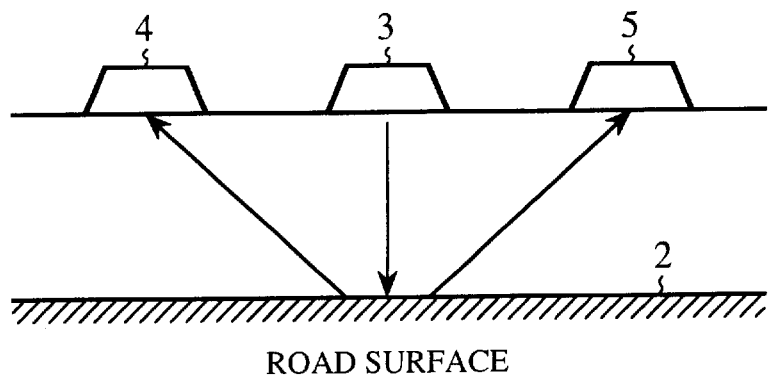
FIG. 6 is an explanatory drawing showing an operation of ultrasonic sensors of the inclination angle measurement apparatus according to embodiment 2 of the present invention.
Figure 7:
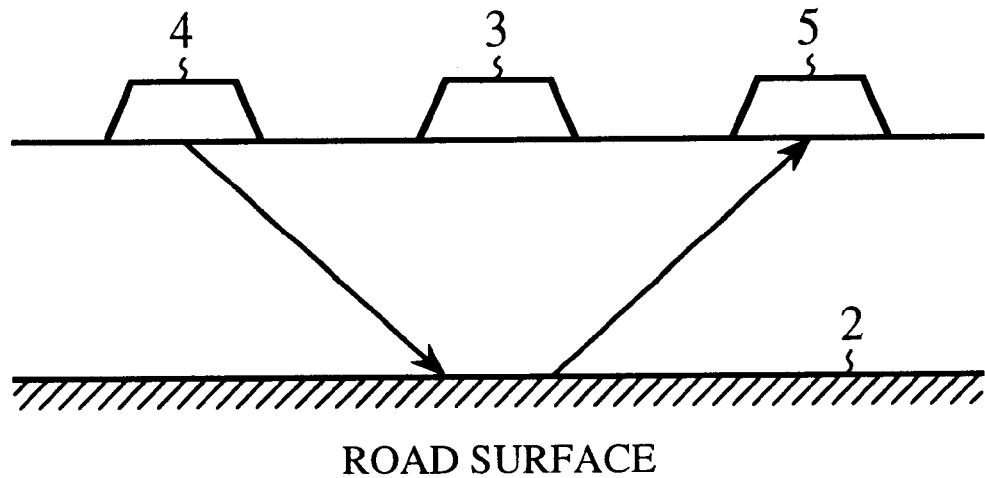
FIG. 7 is an explanatory drawing showing another operation of the ultrasonic sensors of the inclination angle measurement apparatus according to embodiment 2 of the present invention.
Figure 8:
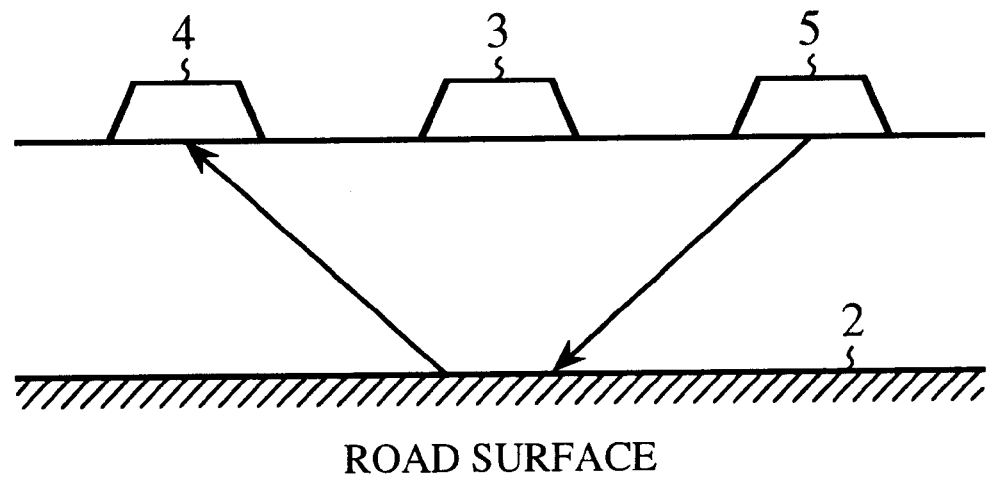
FIG. 8 is an explanatory drawing showing another operation of the ultrasonic sensors of the inclination angle measurement apparatus according to embodiment 2 of the present invention.

FIGS. 6 to 8 are explanatory drawings for showing operations of the three ultrasonic sensors 3 to 5 of the inclination angle measurement apparatus according to embodiment 2 of the present invention. First of all, the first ultrasonic sensor 3 sends an ultrasonic wave toward a road surface 2, as shown in FIG. 6. The second and third ultrasonic sensors 4 and 5 then receive two ultrasonic waves reflected from the road surface 2, and convert them into electric pulse trains, respectively. The second and third ultrasonic sensors 4 and 5 transmit them to a phase synchronization detecting circuit 13 by way of receive circuits 12a and 12b, respectively. The phase synchronization detecting circuit 13 then compares the waveforms of two fixed-frequency pulse trains respectively extracted by the receive circuits 12a and 12b with each other, and converts a phase difference between their phases into an equivalent analog value. The calculation control circuit 14 temporarily holds the phase difference.

Next, the second ultrasonic sensor 4 sends an ultrasonic wave toward the road surface 2, as shown in FIG. 7. The third ultrasonic sensor 5 then receives an ultrasonic wave reflected from the road surface 2, and converts it into an electric pulse train. The third ultrasonic sensor 5 transmits the electric pulse train to the calculation control circuit 14 by way of the second receive circuit 12b and the phase synchronization detecting circuit 13. The calculation control circuit 14 detects the phase of an input fixed-frequency pulse train based on an operation clock and temporarily holds it.

After that, the third ultrasonic sensor 5 sends an ultrasonic wave toward the road surface 2, as shown in FIG. 8. The second ultrasonic sensor 4 then receives an ultrasonic wave reflected from the road surface 2, and converts it into an electric pulse train. The second ultrasonic sensor 4 transmits the electric pulse train to the calculation control circuit 14 by way of the first receive circuit 12a and the phase synchronization detecting circuit 13. The calculation control circuit 14 detects the phase of an input fixed-frequency pulse train based on the operation clock and temporarily holds it.

Each of these processes as shown in FIGS. 6 to 8 is carried out within a short period of time during which wind conditions cannot change, e.g. 10 msec. The calculation control circuit 14 then determines the phase difference between the phase detected during the process shown in FIG. 7 and the phase detected during the process shown in FIG. 8. A time corresponding to this phase difference is an error that occurs due to a wind flowing between the inclination angle measurement apparatus and the road surface, and that is included in the phase difference detected during the process shown in FIG. 6. Therefore, the calculation control circuit 14 subtracts the phase difference that corresponds to the error from the phase difference detected during the process shown in FIG. 6 so as to correct the phase difference detected during the process shown in FIG. 6, and calculates the angle of inclination of the vehicle with respect to the road surface 2 from the corrected phase difference, the propagation velocity of the ultrasonic wave sent by the first ultrasonic sensor 3, and the distance between the second ultrasonic sensor 4 and the third ultrasonic sensor 5.

As mentioned above, in accordance with this embodiment 2, the inclination angle measurement apparatus can accurately measure an angle of inclination of a vehicle with respect to a road surface based on a phase difference between the phases of received ultrasonic waves by using the first ultrasonic sensor 3 for sending an ultrasonic wave toward the road surface, and the second and third ultrasonic sensors 4 and 5 each for sending an ultrasonic wave toward the road surface and for receiving an ultrasonic wave reflected from the road surface. Furthermore, the inclination angle measurement apparatus can correct an error that occurs in the measured angle of inclination due to a wind flowing between the inclination angle measurement apparatus and the road surface.

Embodiment 3.

Figure 9:
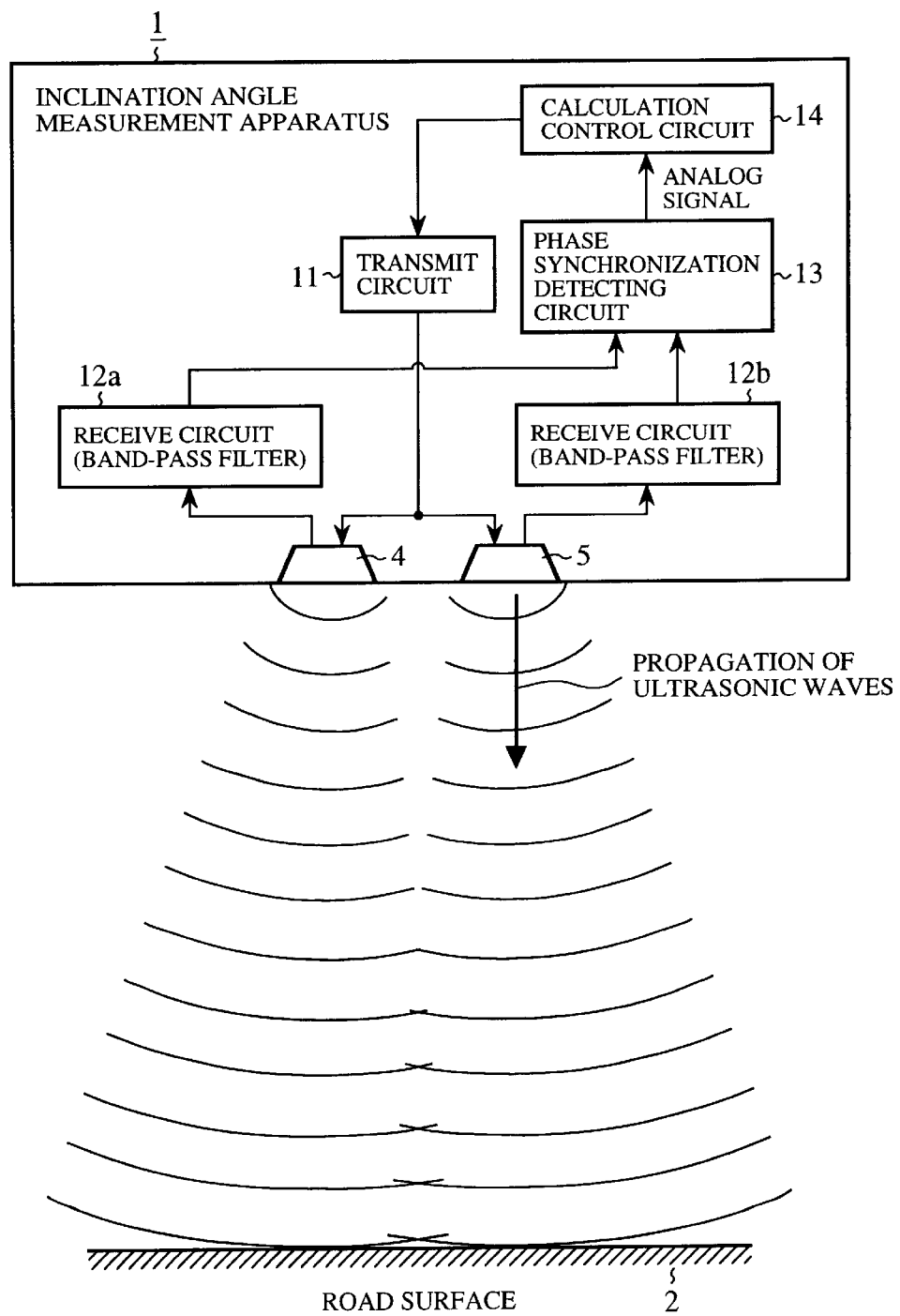
FIG. 9 is a block diagram showing the structure of an inclination angle measurement apparatus according to embodiment 3 of the present invention.

FIG. 9 is a block diagram showing the structure of an inclination angle measurement apparatus according to embodiment 3 of the present invention. The inclination angle measurement apparatus according to this embodiment 3 doesn't include an ultrasonic sensor 3, but includes ultrasonic sensors 4 and 5 each for sending an ultrasonic wave toward a road surface and for receiving an ultrasonic wave reflected from the road surface. The inclination angle measurement apparatus according to this embodiment 3 also includes a transmit circuit 11 that is so constructed as to deliver a fixed-frequency pulse train to the first and second ultrasonic sensors 4 and 5. The first and second ultrasonic sensors 4 and 5 are arranged so that the distance between the first ultrasonic sensor 4 and the second ultrasonic sensor 5 is much shorter than the distance between each of the first and second ultrasonic sensors 4 and 5 and the road surface. The other components included in the inclination angle measurement apparatus according to embodiment 3 are the same as those of the inclination angle measurement apparatus according to embodiment 1 shown in FIG. 1, with the exception that a calculation control circuit 14 sends an instruction for intermittently delivering a fixed-frequency pulse train to the first and second ultrasonic sensors 4 and 5 to the transmit circuit 11.

Next, a description will be made as to an operation of the inclination angle measurement apparatus according to embodiment 3 of the present invention. Unlike the inclination angle measurement apparatuses according to embodiments 1 and 2 of the present invention, the inclination angle measurement apparatus according to embodiment 3 of the present invention measures an angle of inclination of a vehicle by using the two ultrasonic sensors.

The calculation control circuit 14 of FIG. 9 transmits an instruction for intermittently delivering a fixed-frequency pulse train to the transmit circuit 11. This is because each of the first and second ultrasonic sensors 4 and 5 serves as an ultrasonic sensor for sending an ultrasonic wave toward a road surface 2 and for receiving an ultrasonic wave reflected from the road surface 2 and therefore each of them has to receive an ultrasonic wave reflected from the road surface 2 during an interval that each of them sends no ultrasonic wave toward the road surface 2. The transmit circuit 11 generates a fixed-frequency pulse train according to the instruction from the calculation control circuit 14 and delivers it to the first and second ultrasonic sensors 4 and 5. The first and second ultrasonic sensors 4 and 5 send in-phase ultrasonic waves toward the road surface 2, respectively.

Because the sensor pitch between the first ultrasonic sensor 4 and the second ultrasonic sensor 5 is much shorter than the distance between each of the first and second ultrasonic sensors 4 and 5 and the road surface 2, ultrasonic waves simultaneously emitted out of the first and second ultrasonic sensors 4 and 5 propagate and spread concentrically from the midpoint between the first ultrasonic sensor 4 and the second ultrasonic sensor 5. Therefore, it can be assumed that the in-phase ultrasonic waves simultaneously emitted out of the first and second ultrasonic sensors 4 and 5 are approximately equivalent to an ultrasonic wave emitted out of the midpoint between the first ultrasonic sensor 4 and the second ultrasonic sensor 5, i.e., an ultrasonic wave emitted out of the ultrasonic sensor 3 of the inclination angle measurement apparatus according to embodiment 1. As a result, the inclination angle measurement apparatus according to embodiment 3 can measure the angle of inclination of the vehicle with respect to the road surface 2 based on the same principle on which that according to embodiment 1 is based on.

As mentioned above, in accordance with this embodiment 3, the inclination angle measurement apparatus can accurately measure an angle of inclination of a vehicle with respect to a road surface based on the phase difference between the phases of received ultrasonic waves while preventing errors from occurring due to a wind flowing between the inclination angle measurement apparatus and the road surface, by using only the first and second ultrasonic sensors 4 and 5 each for sending an ultrasonic wave toward the road surface and for receiving an ultrasonic wave reflected from the road surface, i.e., by using a simple structure in which the ultrasonic sensor 3 for sending an ultrasonic wave toward the road surface is omitted.

Embodiment 4.

Figure 10:
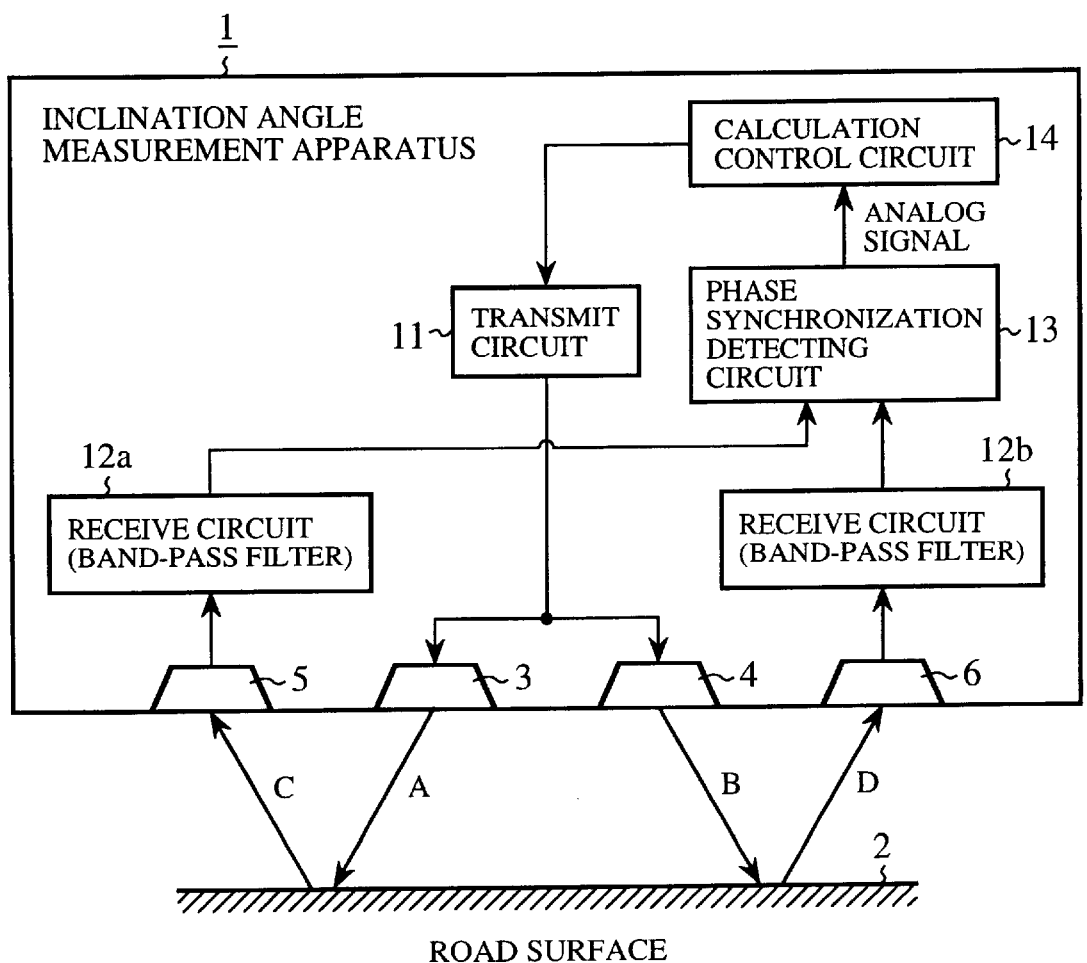
FIG. 10 is a block diagram showing the structure of an inclination angle measurement apparatus according to embodiment 4 of the present invention.

FIG. 10 is a block diagram showing the structure of an inclination angle measurement apparatus according to embodiment 4 of the present invention. The inclination angle measurement apparatus according to embodiment 4 is provided with first and second ultrasonic sensors 3 and 4 each for sending an ultrasonic wave toward a road surface such as a road surface, and third and fourth ultrasonic sensors 5 and 6 each for receiving an ultrasonic wave reflected from the road surface. The inclination angle measurement apparatus according to embodiment 4 also includes a transmit circuit 11 that is so constructed as to deliver a fixed-frequency pulse train to the first and second ultrasonic sensors 3 and 4. A pulse train from the third ultrasonic sensor 5 is delivered to a first receive circuit 12a, and a pulse train from the fourth ultrasonic sensor 6 is delivered to a second receive circuit 12b. The ultrasonic sensors 3 to 6 are arranged so that the distance (sensor pitch) between the first and third ultrasonic sensors 3 and 5 is the same as the distance (sensor pitch) between the second and fourth ultrasonic sensors 4 and 6. The other components included in the inclination angle measurement apparatus according to embodiment 4 are the same as those of the inclination angle measurement apparatus according to embodiment 1 shown in FIG. 1, with the exception that a calculation control circuit 14 has a calculating function different from that of the calculation control circuit 14 of the inclination angle measurement apparatus according to embodiment 1.

Next, a description will be made as to an operation of the inclination angle measurement apparatus according to embodiment 4 of the present invention. The transmit circuit 11 of FIG. 10 generates a fixed-frequency pulse train according to an instruction from the calculation control circuit 14 and delivers it to the first and second ultrasonic sensors 3 and 4. The first and second ultrasonic sensors 3 and 4 convert the electric signal acquired from the transmit circuit 11 into vibrational energy so as to send two ultrasonic waves A and B toward a road surface 2, respectively.

The ultrasonic waves A and B hit the road surface 2 and are reflected from the road surface 2, and the third and fourth ultrasonic sensors 5 and 6 receive ultrasonic waves C and D reflected from the road surface 2 and generate electric pulse signals having frequencies corresponding to the received ultrasonic waves C and D, respectively. The third and fourth ultrasonic sensors 5 and 6 then transmit the electric pulse signals, by way of the first and second receive circuits 12a and 12b, to a phase synchronization detecting circuit 13, respectively. The phase synchronization detecting circuit 13 compares the waveforms of fixed-frequency pulse trains respectively extracted by the first and second receive circuit 12a and 12b with each other so as to determine a phase difference between the phases of the fixed-frequency pulse trains, converts the phase difference into an equivalent analog value, and delivers it to the calculation control circuit 14. The calculation control circuit 14 calculates the angle of inclination of the vehicle with respect to the road surface 2 from the phase difference, the propagation velocity of the ultrasonic waves sent by the first and second ultrasonic sensors 3 and 4, and the distance between the first ultrasonic sensor 3 and the second ultrasonic sensor 4.

Figure 11:
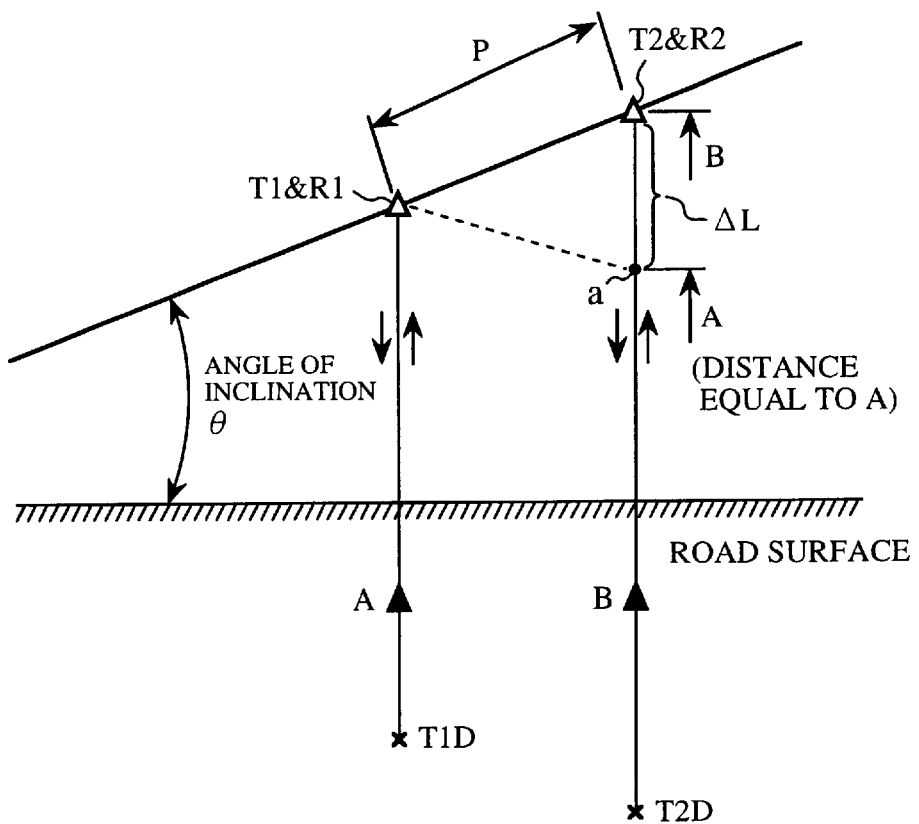
FIG. 11 is an explanatory drawing showing the principle of the inclination angle measurement apparatus according to embodiment 4 of the present invention.
Figure 12:
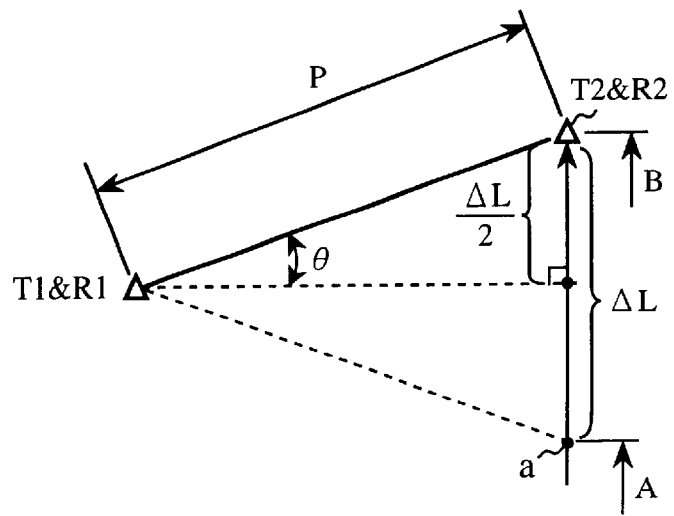
FIG. 12 is an explanatory drawing showing a part of FIG. 11 in detail.

Next, the principle underling the measurement of the angle of inclination by using the four ultrasonic sensors 3 to 6 will be explained. FIG. 11 is an explanatory drawing showing the principle of the inclination angle measurement apparatus according to embodiment 4 of the present invention. In the figure, T1&R1 denotes a position of the first and third ultrasonic sensors 3 and 5, and T2&R2 denotes a position of the second and fourth ultrasonic sensors 4 and 6. Because the sensor pitch is much less than the distance between the road surface 2 and the four ultrasonic sensors 3 to 6, it can be assumed that the first and third ultrasonic sensors 3 and 5 actually located separately are placed at the same location and the second and fourth ultrasonic sensors 4 and 6 actually located separately are placed at the same location. T1D denotes a virtual image point of the first and third ultrasonic sensors 3 and 5, T2D denotes a virtual image point of the second and fourth ultrasonic sensors 4 and 6, A denotes the distance between T1&R1 and T1D, B denotes the distance between T2&R2 and T2D, a denotes a point having a distance from T2D that is equal to A, and located on a line segment between T2&R2 and T2D, $\Delta L$ denotes the length of a line segment between T2&R2 and a, P denotes the distance between T1&R1 and T2&R2, and $\theta$ denotes the angle of inclination of the lower surface of the vehicle with respect to the road surface. FIG. 12 is an explanatory drawing showing a part of FIG. 11 in detail.

The distance A is equivalent to the length of a path running from the position T1D to the position T1&R1, along which the ultrasonic wave sent by the first ultrasonic sensor 3 travels to the third ultrasonic sensor 5, and the distance B is equivalent to the length of a path running from the position T2D to the position T2&R2, along which the ultrasonic wave sent by the second ultrasonic sensor 4 travels to the fourth ultrasonic sensor 6. The difference between the distance B and the distance A, i.e., the distance $\Delta L$ is calculated from the phase difference delivered from the phase synchronization detecting circuit 13, and the propagation velocity of the ultrasonic waves sent by the first and second ultrasonic sensors 3 and 4.

Therefore, it can be assumed that $\sin \theta = (\Delta L/2)/P$. Thus the angle of inclination $\theta$ can be calculated from the phase difference delivered from the phase synchronization detecting circuit 13, the propagation velocity of the ultrasonic waves sent by the first and second ultrasonic sensors 3 and 4, and the distance P between T1&R1 and T2&R2.

In accordance with this embodiment 4, because when a wind flows between the four ultrasonic sensors 3 to 6 and the road surface 2, nearly the same influence is exerted on a path along which the ultrasonic wave emitted out of the first ultrasonic sensor 3 travels, by way of the road surface 2, to the third ultrasonic sensor 5, and a path along which the ultrasonic wave emitted out of the second ultrasonic sensor 4 travels, by way of the road surface 2, to the fourth ultrasonic sensor 6, the influence of the wind is cancelled during the detection of the phase difference between the phases of the two ultrasonic waves received by the third and fourth ultrasonic sensors 5 and 6 and no error occurs in the measurement results due to the influence of the wind.

As mentioned above, in accordance with this embodiment 4, the inclination angle measurement apparatus can accurately measure an angle of inclination of a vehicle with respect to a road surface based on the phase difference between the phases of received ultrasonic waves while preventing errors from occurring due to a wind flowing between the inclination angle measurement apparatus and the road surface, by using the first and second ultrasonic sensors 3 and 4 each for sending an ultrasonic wave toward the road surface, and the third and fourth ultrasonic sensors 5 and 6 each for receiving an ultrasonic wave reflected from the road surface.

Embodiment 5.

Figure 13:
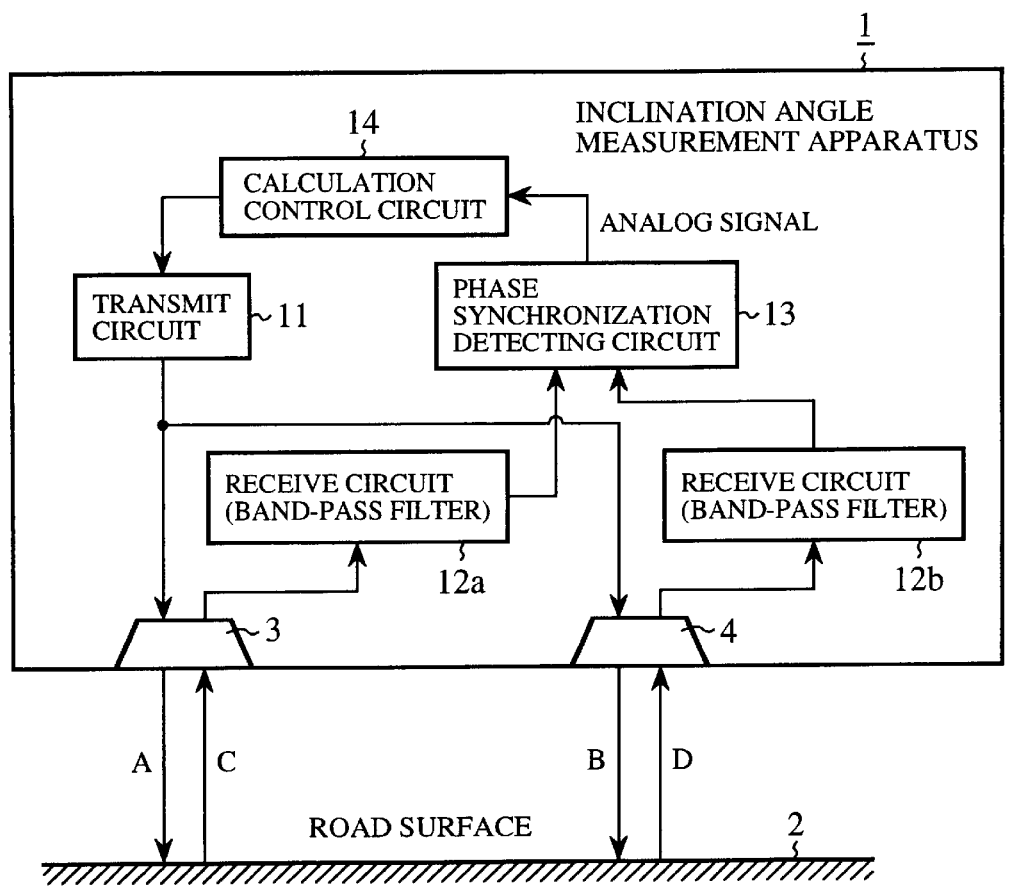
FIG. 13 is a block diagram showing the structure of an inclination angle measurement apparatus according to embodiment 5 of the present invention.

FIG. 13 is a block diagram showing the structure of an inclination angle measurement apparatus according to embodiment 5 of the present invention. The inclination angle measurement apparatus according to embodiment 5 is provided with two ultrasonic sensors 3 and 4 each for sending an ultrasonic wave toward a road surface, such as a road surface 2, and for receiving an ultrasonic wave reflected from the road surface, as shown in the figure. An electric pulse train from the first ultrasonic sensor 3 is delivered to a first receive circuit 12a, and an electric pulse train from the second ultrasonic sensor 4 is delivered to a second receive circuit 12b. The other components included in the inclination angle measurement apparatus according to embodiment 5 are the same as those of the inclination angle measurement apparatus according to embodiment 4 shown in FIG. 10, with the exception that a calculation control circuit 14 sends an instruction for intermittently delivering a fixed-frequency pulse train to the first and second ultrasonic sensors 3 and 4 to a transmit circuit 11.

Next, a description will be made as to an operation of the inclination angle measurement apparatus according to embodiment 5 of the present invention. The calculation control circuit 14 of FIG. 13 transmits an instruction for intermittently delivering a fixed-frequency pulse train to the first and second ultrasonic sensors 3 and 4 to the transmit circuit 11. This is because each of the first and second ultrasonic sensors 3 and 4 serves as an ultrasonic sensor for sending an ultrasonic wave toward a road surface 2 and for receiving an ultrasonic wave reflected from the road surface 2 and therefore each of them has to receive an ultrasonic wave reflected from the road surface 2 during an interval that each of them sends no ultrasonic wave toward the road surface 2. The transmit circuit 11 generates a fixed-frequency pulse train according to the instruction from the calculation control circuit 14 and delivers it to the first and second ultrasonic sensors 3 and 4. The first and second ultrasonic sensors 3 and 4 send in-phase ultrasonic waves A and C to the road surface 2, respectively.

The two ultrasonic waves A and C hit the road surface 2 and are reflected from the road surface 2, and the first and second ultrasonic sensors 3 and 4 receive two ultrasonic waves B and D reflected from the road surface 2 and generate electric pulse signals having frequencies corresponding to the ultrasonic waves B and D, respectively. The first and second ultrasonic sensors 3 and 4 then transmit them, by way of the receive circuits 12a and 12b, to a phase synchronization detecting circuit 13, respectively. The phase synchronization detecting circuit 13 compares the waveforms of fixed-frequency pulse trains respectively extracted by the receive circuit 12a and 12b with each other. The reflected ultrasonic wave received by each of the first and second ultrasonic sensors 3 and 4 has inadequate energy and a waveform of small amplitude immediately after received. The phase synchronization detecting circuit 13 may not be able to recognize the waveforms of the two reflected ultrasonic waves immediately after the first and second ultrasonic sensors 3 and 4 start receiving the two reflected ultrasonic waves. Therefore, after the two reflected ultrasonic waves have adequate signal levels, the phase synchronization detecting circuit 13 compares the waveforms of the fixed-frequency pulse trains respectively extracted by the receive circuit 12a and 12b with each other.

Figure 14:
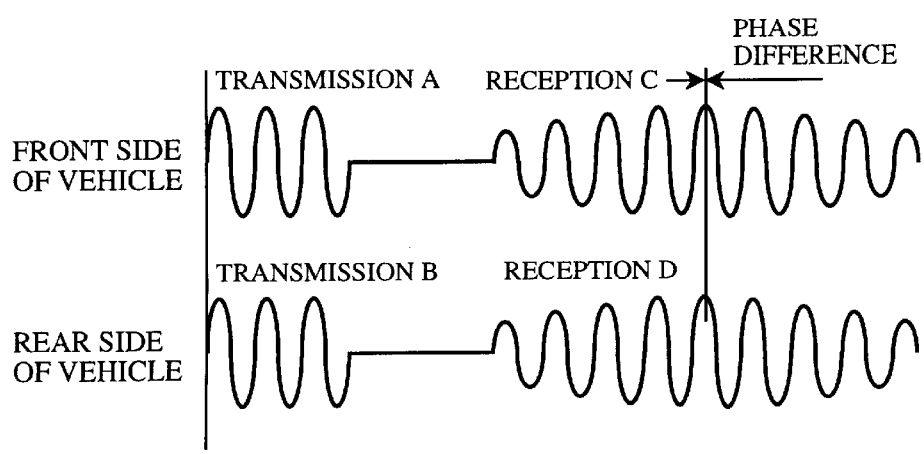
FIGS. 14 to 16 are explanatory drawings showing a relationship between the phases of two ultrasonic waves reflected from a road surface and the direction in which a vehicle is inclined with respect to the road surface.
Figure 15:
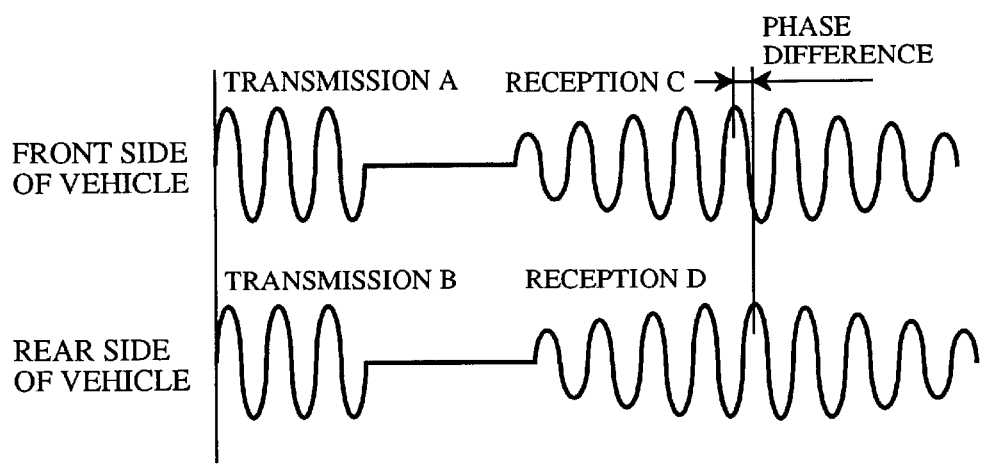
Figure 16:
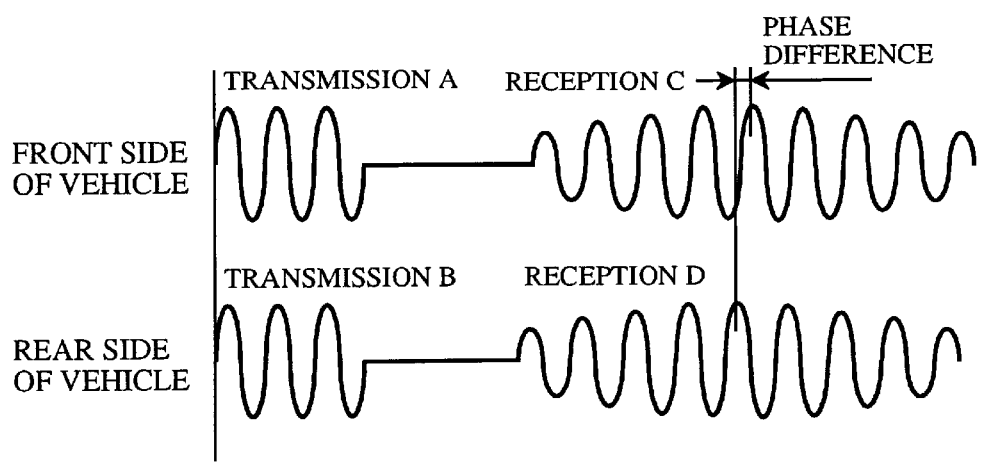

Because the first and second ultrasonic sensors 3 and 4 simultaneously receive the two ultrasonic waves C and D reflected from the road surface 2 when the vehicle is parallel to the road surface 2, the two ultrasonic waves C and D are in phase with each other, as shown in FIG. 14. In contrast, when the vehicle's front side goes down toward the road surface 2, that is, when the vehicle's front side is inclined toward the road surface 2, the first ultrasonic sensor 3 receives the reflected wave C earlier than the second ultrasonic sensor 4 receives the reflected wave D. In other words, the phase of the ultrasonic wave C received by the first ultrasonic sensor 3 leads the phase of the ultrasonic wave D received by the second ultrasonic sensor 4, as shown in FIG. 15. Oppositely, when the vehicle's rear side goes down toward the road surface 2, that is, when the vehicle's rear side is inclined toward the road surface 2, the first ultrasonic sensor 3 receives the reflected wave C later than the second ultrasonic sensor 4 receives the reflected wave D. In other words, the phase of the ultrasonic wave C received by the first ultrasonic sensor 3 lags the phase of the ultrasonic wave D received by the second ultrasonic sensor 4, as shown in FIG. 16. The phase synchronization detecting circuit 13 acquires the phase difference between the phases of the ultrasonic waves C and D, converts this phase difference into an equivalent analog value, and delivers the analog value to the calculation control circuit 14. The calculation control circuit 14 calculates the angle of inclination of the vehicle with respect to the road surface 2 from the phase difference, the propagation velocity of the ultrasonic waves sent by the first and second ultrasonic sensors 3 and 4, and the distance between the first and second ultrasonic sensors 3 and 4.

As mentioned above, in accordance with this embodiment 5, the inclination angle measurement apparatus can accurately measure an angle of inclination of a vehicle with respect to a road surface based on the phase difference between the phases of received ultrasonic waves while preventing errors from occurring due to a wind flowing between the inclination angle measurement apparatus and the road surface, by using only the first and second ultrasonic sensors 3 and 4 each for sending an ultrasonic wave toward the road surface and for receiving an ultrasonic wave reflected from the road surface, i.e., by using a simple structure in which two ultrasonic sensors for sending an ultrasonic wave toward the road surface or receiving an ultrasonic wave reflected from the road surface are omitted.
Embodiment 6.

Figure 17:
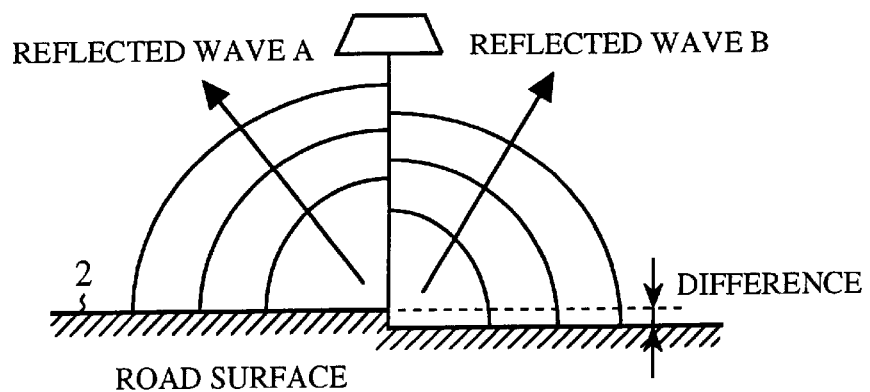
FIG. 17 is an explanatory drawing showing a case where a phase difference occurs in two reflected waves due to road irregularities in an inclination angle measurement apparatus according to embodiment 6 of the present invention.
Figure 18:
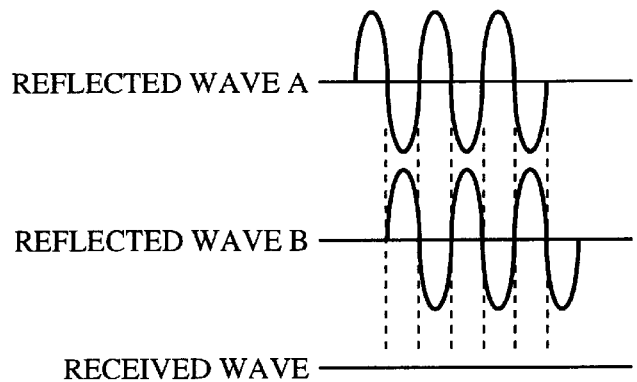
FIG. 18 is an explanatory drawing showing a case where two ultrasonic waves reflected from a road surface are 180° out of phase with each other and therefore received waves vanish.

FIG. 17 is an explanatory drawing showing a case where a phase difference occurs in two reflected waves due to road irregularities, and FIG. 18 is an explanatory drawing showing an example in which the two reflected waves are 180° out of phase with each other and therefore received waves vanish.

When there is a difference in level on a road surface 2 from which ultrasonic waves are reflected, a phase difference that depends on the height of the difference in level occurs in the reflected ultrasonic waves. When each ultrasonic sensor sends an ultrasonic wave toward the road surface 2 having a difference in level as shown in FIG. 17, two parts of the road surface 2 separated by the difference reflect the incident ultrasonic wave at different times, and this results in two reflected waves A and B. If the two reflected waves A and B are 180° out of phase with each other, those reflected waves are attenuated extremely due to an interference between them when reaching an ultrasonic sensor, and therefore the ultrasonic sensor cannot receive any received wave, as shown in FIG. 18. For example, when the road surface 2 has a difference in level that is caused by road irregularities or water drops thereon and that has a height of about 2 mm which is equal to one-quarter wavelength of ultrasonic waves of a frequency of 40 kHz, the two reflected waves A and B are 180° out of phase with each other if they have a frequency of 40 kHz, and therefore no ultrasonic sensor can receive any received wave. In contrast, when the ultrasonic wave sent toward the road surface 2 has a frequency of 40 kHz or less, e.g. 20 kHz, the two reflected waves A and B are 180° out of phase with each other only if the road surface 2 has a difference in level having a height of 4 mm, which is caused by road irregularities or water drops thereon. Therefore, when the ultrasonic wave sent toward the road surface 2 has a frequency of 40 kHz or less, e.g. 20 kHz, the frequency of being under the influence of such a difference in level on the road surface can be reduced and errors can be prevented from occurring due to road irregularities or water drops on the road surface 2. When the ultrasonic wave sent toward the road surface 2 has a frequency of 10 kHz, for example, human beings can hear the ultrasonic wave and therefore a noise problem arises. Therefore, it is preferable that each ultrasonic wave sent toward the road surface 2 has a frequency of about 20 kHz. In this case, the inclination angle measurement apparatus can prevent a noise problem from arising.
Embodiment 7.

Figure 19:
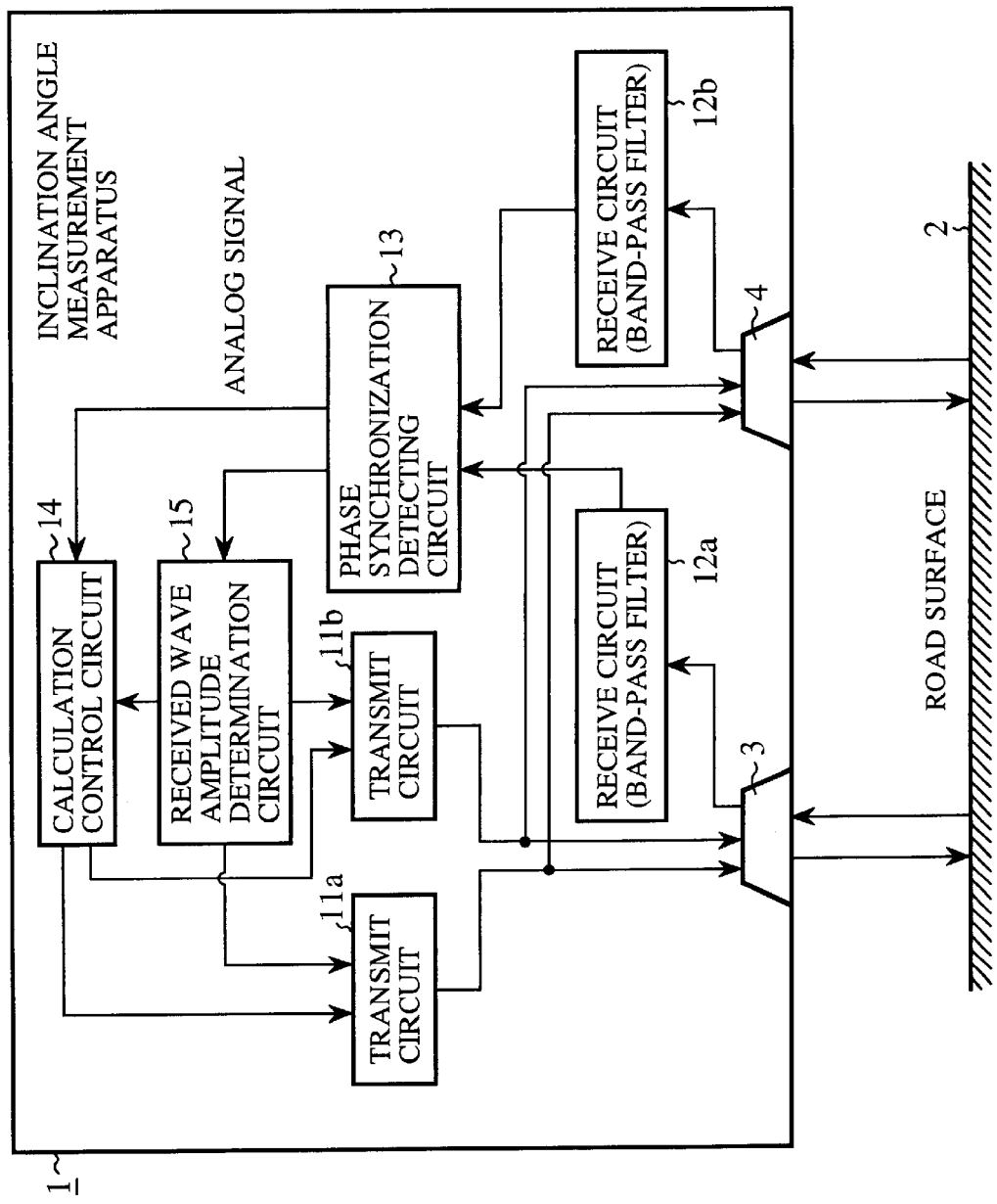
FIG. 19 is a block diagram showing the structure of an inclination angle measurement apparatus according to embodiment 7 of the present invention.

FIG. 19 is a block diagram showing the structure of an inclination angle measurement apparatus according to embodiment 7 of the present invention. In the figure, reference numeral 11a denotes a first transmit circuit for generating a fixed-frequency pulse train of a frequency of about 40 kHz, for example, reference numeral 11b denotes a second transmit circuit for generating a fixed-frequency pulse train of a frequency of about 20 kHz, for example, and reference numeral 15 denotes a received wave amplitude determination circuit for detecting the amplitudes of received waves, and for switching between the first and second transmit circuits 11a and 11b according to a decrease in the amplitudes of the received waves. The other components included in the inclination angle measurement apparatus according to embodiment 7 are the same as those of the inclination angle measurement apparatus according to embodiment 5 shown in FIG. 13.

In normal operation, the inclination angle measurement apparatus enables the first transmit circuit 11a to generate and deliver a fixed-frequency pulse train of a frequency of about 40 kHz, for example, to first and second ultrasonic sensors 3 and 4 so that each of them sends an ultrasonic wave of a frequency of about 40 kHz toward a road surface 2. When road irregularities or water drops on the road surface 2 have a height equal to the one-quarter wavelength of the ultrasonic wave of a frequency of about 40 kHz, two received waves are reduced in amplitude, as shown in FIG. 18, and therefore the inclination angle measurement apparatus cannot measure the phase difference between them. At this time, when the received wave amplitude determination circuit 15 determines that each of the two received waves doesn't have a predetermined amplitude or more, the received wave amplitude determination circuit 15 stops the first transmit circuit 11a and then enables the second transmit circuit 11b to generate and deliver a fixed-frequency pulse train of a frequency of about 20 kHz, for example, to the first and second ultrasonic sensors 3 and 4 so that each of them sends an ultrasonic wave of a frequency of about 20 kHz toward the road surface 2.

Thus, even when two reflected ultrasonic waves interfere with each other because of road irregularities or water drops on the road surface and therefore they decrease in amplitude, the inclination angle measurement apparatus can measure the phase difference between the two reflected ultrasonic waves by switching between the two frequencies of each ultrasonic wave sent toward the road surface.

As previously mentioned, the inclination angle measurement apparatus according to embodiment 7 of the present invention can have a structure similar to that of above-mentioned embodiment 5. As an alternative, the inclination angle measurement apparatus according to embodiment 7 of the present invention can have a structure similar to that of above-mentioned embodiment 1, 2, 3 or 4.
Embodiment 8.

Figure 20:
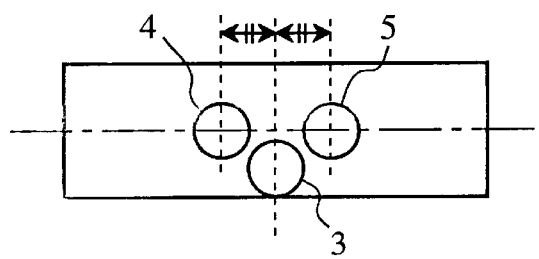
FIG. 20 is a bottom plan view showing the placement of ultrasonic sensors included in an inclination angle measurement apparatus according to embodiment 8 of the present invention.

FIG. 20 is a bottom plan view showing the placement of three ultrasonic sensors of an inclination angle measurement apparatus according to embodiment 8 of the present invention.

In the inclination angle measurement apparatus according to above-mentioned embodiment 1 or the like, three ultrasonic sensors 3 to 5 are arranged in a line along the length of a vehicle, as shown in FIG. 2. In this case, although the second and third ultrasonic sensors 4 and 5 each for receiving a reflected ultrasonic wave have to be brought close to each other in order to expand a range of measurable angles of inclination, they cannot be brought close each other because the first ultrasonic sensor 3 for sending an ultrasonic wave toward a road surface obstructs them. In accordance with this embodiment 8, in order to solve this problem, the first ultrasonic sensor 3 is moved, by a predetermined distance, along the width of the vehicle on a perpendicular bisector of a line segment connecting the second and third ultrasonic sensors 4 and 5 with each other, as shown in FIG. 20. Because the first ultrasonic sensor 3 is moved along the width of the vehicle, it is not necessary to provide additional space for the first ultrasonic sensor 3, and the spacing between the second and third ultrasonic sensors 4 and 5 can be easily reduced and therefore the range of measurable angles of inclination can be expanded.

Embodiment 9.

Figure 21:
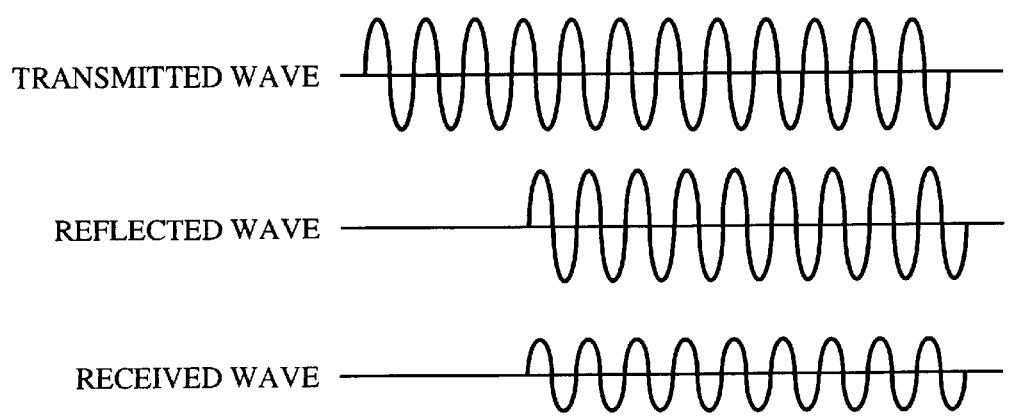
FIG. 21 is a diagram showing the waveforms of reflected waves and received waves when each ultrasonic sensor for sending an ultrasonic wave continuously sends an ultrasonic wave toward a road surface.
Figure 22:
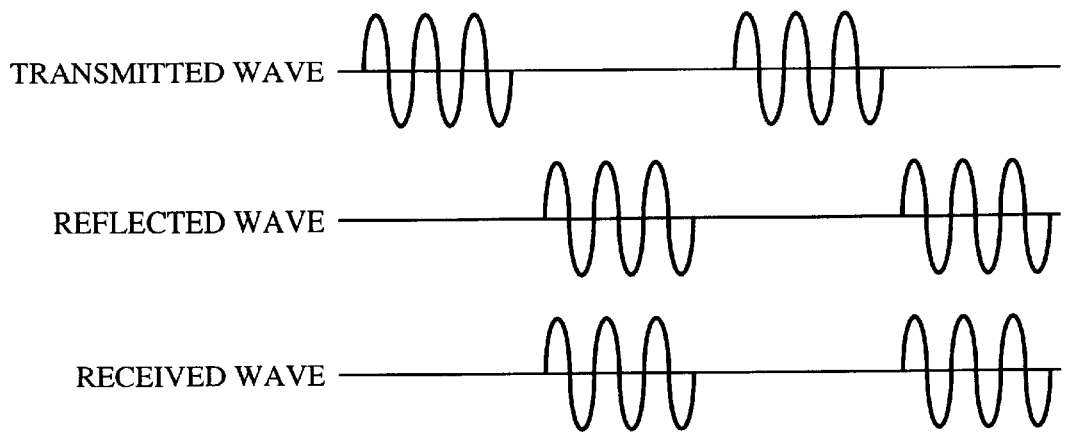
FIG. 22 is a diagram showing the waveforms of reflected waves and received waves when each ultrasonic sensor for sending an ultrasonic wave of an inclination angle measurement apparatus according to embodiment 9 intermittently sends an ultrasonic wave toward a road surface.

FIG. 21 is a diagram showing the waveforms of reflected waves and received waves when each ultrasonic sensor for sending an ultrasonic wave continuously sends an ultrasonic wave toward a road surface such as a road surface, and FIG. 22 is a diagram showing the waveforms of reflected waves and received waves when each ultrasonic sensor for sending an ultrasonic wave of an inclination angle measurement apparatus according to embodiment 9 intermittently sends an ultrasonic wave toward a road surface such as a road surface.

As shown in FIG. 21, when each ultrasonic sensor for sending an ultrasonic wave toward a road surface keeps sending an ultrasonic wave toward a road surface, in order for an inclination angle measurement apparatus to measure an angle of inclination of a vehicle with respect to the road surface, a reflected ultrasonic wave that has been reflected from the road surface and returns to each ultrasonic sensor interferes with an ultrasonic wave newly sent by each ultrasonic sensor and is therefore attenuated and transformed and this results in an impossibility of measuring the angle of inclination of the vehicle with a high degree of accuracy.

In contrast, in the inclination angle measurement apparatus according to embodiment 9, each ultrasonic sensor for sending an ultrasonic wave intermittently sends an ultrasonic wave having a several number of pulses toward the road surface so that a reflected ultrasonic wave that has been reflected from the road surface and returns to each ultrasonic sensor does not interfere with an ultrasonic wave newly sent by each ultrasonic sensor, as shown in FIG. 22. As a result, the inclination angle measurement apparatus can prevent the amplitude of each received ultrasonic wave from becoming small and being transformed due to interference between an ultrasonic wave sent toward the object and each reflected ultrasonic wave, thereby preventing the measurement of the angle of inclination of the vehicle form becoming an impossibility.

Embodiment 10.

Figure 23:
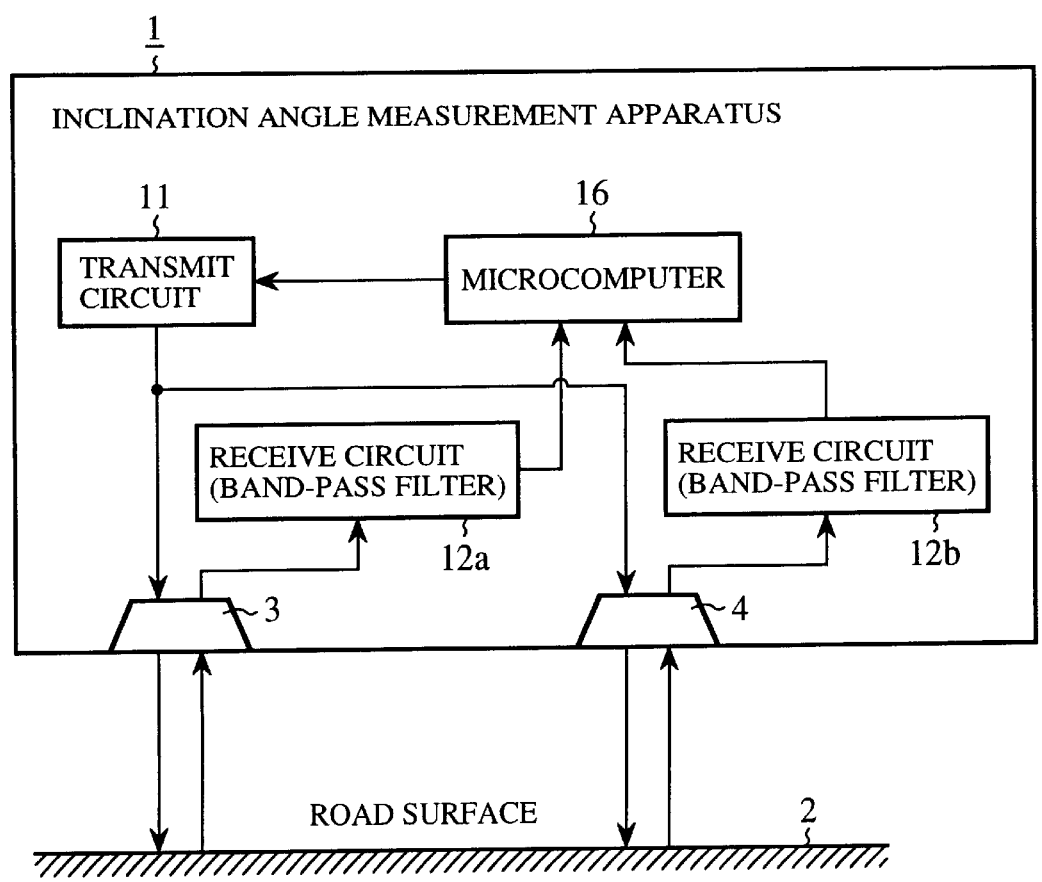
FIG. 23 is a block diagram showing the structure of an inclination angle measurement apparatus according to embodiment 10 of the present invention.

FIG. 23 is a block diagram showing the structure of an inclination angle measurement apparatus according to embodiment 10 of the present invention. In the figure, reference numeral 16 denotes a microcomputer that accepts fixed-frequency pulse trains that pass through receive circuits 12a and 12b, respectively, and that determines an angle of inclination of a vehicle with respect to a road surface from the phase difference between those fixed-frequency pulse trains. The other components included in the inclination angle measurement apparatus according to embodiment 10 are the same as those of the inclination angle measurement apparatus according to embodiment 5 shown in FIG. 13, with the exception that the phase synchronization detecting circuit 13 and the calculation control circuit 14 are omitted.

The microcomputer 16 shown in FIG. 23 accepts fixed-frequency pulse trains that pass through the receive circuits 12a and 12b, respectively, and measures the angle of inclination of the vehicle with respect to the road surface 2 from the phase difference between those fixed-frequency pulse trains. Therefore, the inclination angle measurement apparatus according to embodiment 10 needs not have the phase synchronization detecting circuit 13 and the calculation control circuit 14 as shown in FIG. 13.

Embodiment 11.

Figure 24:
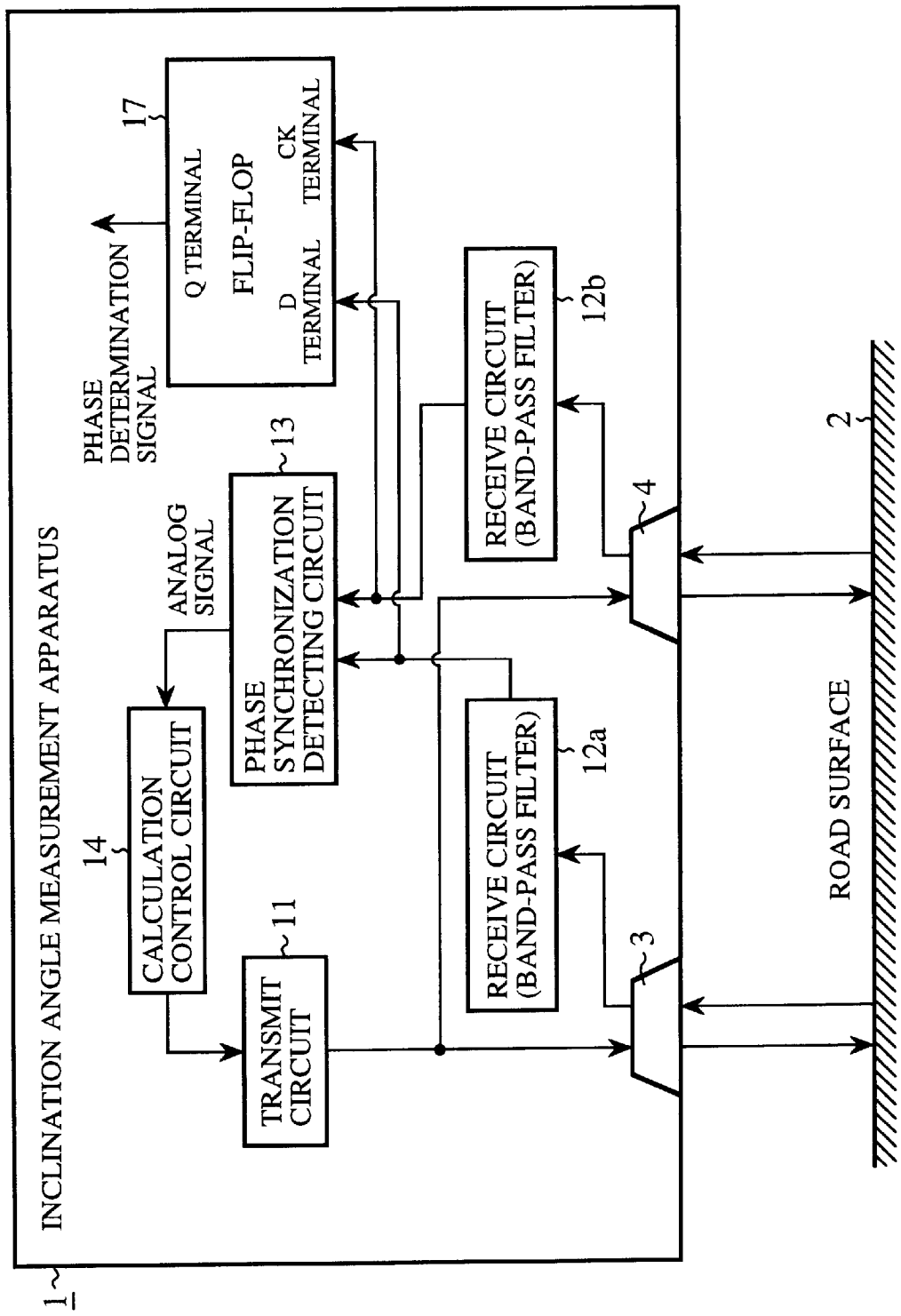
FIG. 24 is a block diagram showing the structure of an inclination angle measurement apparatus according to embodiment 11 of the present invention.

FIG. 24 is a block diagram showing the structure of an inclination angle measurement apparatus according to embodiment 11 of the present invention. In the figure, reference numeral 17 denotes a flip-flop having a D (data) terminal for receiving a fixed-frequency pulse train that passes through a receive circuit 12a, a CK (clock) terminal for receiving a fixed-frequency pulse train that passes through another receive circuit 12b, and a Q (output) terminal for outputting a phase judgment signal indicating a direction in which a vehicle is inclined. The other components included in the inclination angle measurement apparatus according to embodiment 11 are the same as those of the inclination angle measurement apparatus according to embodiment 5 shown in FIG. 13.

The flip-flop 17 shown in FIG. 24 accepts a fixed-frequency pulse train that passes the first receive circuit 12a by way of D terminal and accepts a fixed-frequency pulse train that passes the second receive circuit 12a by way of CK terminal.

Figure 25:
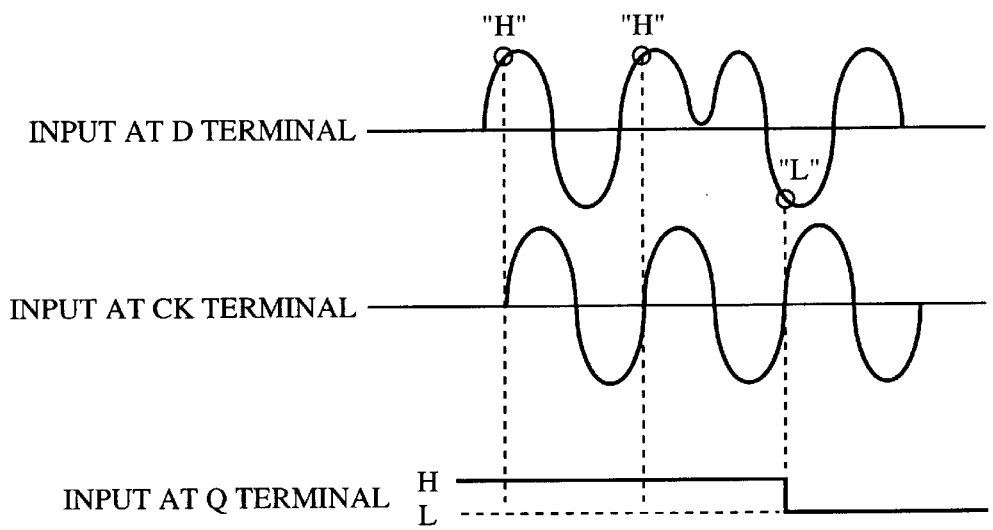
FIG. 25 is a timing chart showing an operation of a flip-flop of the inclination angle measurement apparatus according to embodiment 11.

FIG. 25 is a timing chart showing an operation of the flip-flop 17. As shown in the figure, when detecting a "High" or "Low" at D terminal upon reception of an input via CK terminal, the flip-flop 17 determines that the phase of the fixed-frequency pulse train that passes through the first receive circuit 12a leads or lags the phase of the fixed-frequency pulse train that passes through the second receive circuit 12b and then outputs a phase judgment signal indicating a direction in which the vehicle is inclined via Q output terminal.

Thus, because the inclination angle measurement apparatus includes the flip-flop 17 having a data terminal for receiving a fixed-frequency pulse train that passes through the first receive circuit 12a, a clock terminal for receiving a fixed-frequency pulse train that passes through the second receive circuit 12b, and an output terminal for outputting a phase judgment signal indicating a direction in which a vehicle is inclined, the inclination angle measurement apparatus can detect the direction in which the vehicle is inclined with a simple structure.

Embodiment 12.

In the inclination angle measurement apparatus according to either of above-mentioned embodiments, when a wind is flowing in a space in which an ultrasonic wave sent by each ultrasonic sensor for sending an ultrasonic wave disposed on a vehicle propagates or when the inclination angle measurement apparatus has vibrations or noise caused by the vehicle, a phase shift can occur in the ultrasonic wave and a change can occur in the measurement result of the angle of inclination of the vehicle with respect to a road surface such as a road surface. In accordance with this embodiment 12, an inclination angle measurement apparatus is so constructed as to cause all ultrasonic sensors included therein to work two or more times and to acquire a plurality of measurement results of the angle of inclination of the vehicle with respect to a road surface and an average of them so as to determine the angle of inclination of the vehicle with respect to the road surface, in order to reduce changes in the measurement results of the angle of inclination.

Thus the inclination angle measurement apparatus according to embodiment 12 can provide a reliable measurement result of an angle of inclination of a vehicle with respect to a road surface even if there is a cause of measurement errors, such as vibrations or noise caused by the vehicle.

Embodiment 13.

Figure 26:
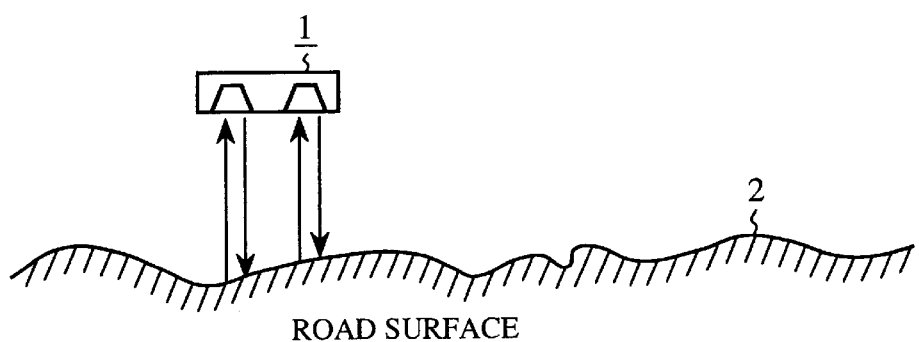
FIG. 26 is an explanatory drawing showing a status of an inclination angle measurement apparatus according to embodiment 13 of the present invention when it measures the angle of inclination of a vehicle when the vehicle stops.
Figure 27:
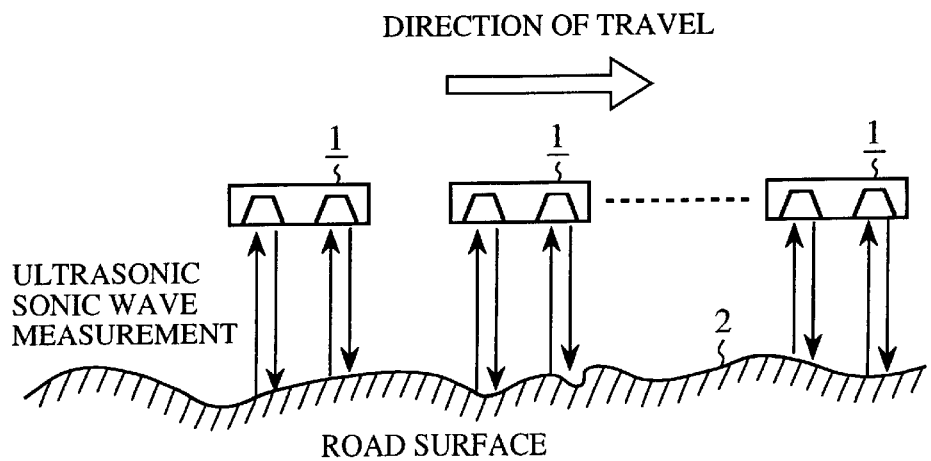
FIG. 27 is an explanatory drawing showing a status of the inclination angle measurement apparatus according to embodiment 13 when it measures the angle of inclination of the vehicle when the vehicle is traveling.

FIG. 26 is an explanatory drawing showing a status of an inclination angle measurement apparatus according to embodiment 13 of the present invention when it measures an angle of inclination of a vehicle when the vehicle stops, and FIG. 27 is an explanatory drawing showing a status of the inclination angle measurement apparatus according to embodiment 13 when it measures the angle of inclination of the vehicle when the vehicle is traveling.

While the vehicle stops, as shown in FIG. 26, the inclination angle measurement apparatus may erroneously measure the angle of inclination of the vehicle with respect to a road surface 2 because of road irregularities, water drops on the road surface 2, or the like. On the other hand, while the vehicle is traveling at a high speed, wind noise having a component of a frequency close to that of an ultrasonic wave sent by each ultrasonic sensor is caused and therefore the inclination angle measurement apparatus may erroneously measure the angle of inclination of the vehicle with respect to the road surface 2.

In accordance with this embodiment 13, the inclination angle measurement apparatus is so constructed as to cause all ultrasonic sensors included therein to work to determine the angle of inclination of the vehicle with respect to the road surface 2 while the vehicle is traveling at a low speed, as shown in FIG. 27, so that neither the influence of road irregularities, water drops on the road surface 2, or the like nor the influence of wind noise is exerted upon the measurement of the angle of inclination of the vehicle with respect to the road surface 2. Concretely, the inclination angle measurement apparatus enables all ultrasonic sensors included therein to work while the vehicle is traveling at a speed that falls within a predetermined range, e.g., at a speed greater than 0 km/h and equal to or less than 50 km/h.

In accordance with this embodiment 13, because the inclination angle measurement apparatus is enabled while the vehicle is traveling at a speed that falls within a predetermined range, the measurement of an angle of inclination of a vehicle is inhibited while there is a cause of a measurement error, for example, while the vehicle stops and the inclination angle measurement apparatus is therefore under the influence of road irregularities, water drops on a road surface 2, or the like, or while the vehicle is traveling at a high speed and the inclination angle measurement apparatus is therefore under the influence of wind noise. As a result, reliable measurement results are acquired.

Embodiment 14.

Figure 28:
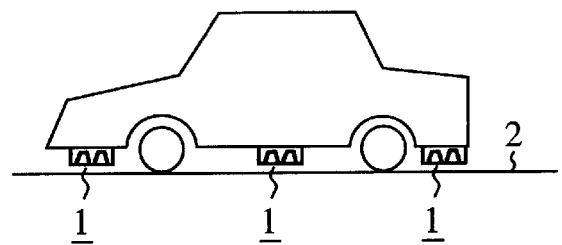
FIG. 28 is an explanatory drawing showing the placement of inclination angle measurement units included in an inclination angle measurement apparatus according to embodiment 14 of the present invention and mounted in a vehicle.

FIG. 28 is an explanatory drawing showing the placement of inclination angle measurement units included in an inclination angle measurement apparatus according to embodiment 14 of the present invention and mounted on a vehicle.

When only one inclination angle measurement apparatus according to either of above-mentioned embodiments is placed on a vehicle, the inclination angle measurement apparatus may erroneously measure an angle of inclination of the vehicle with respect to a road surface 2 because of local road irregularities.

In contrast, the inclination angle measurement apparatus according to this embodiment 14 is provided with a plurality of inclination measurement units arranged at different positions of a vehicle along the length of the vehicle, as shown in FIG. 28, and can acquire a reliable measurement result by averaging angles of inclination of the vehicle, which are acquired by these inclination measurement units.

Embodiment 15.

Figure 29:
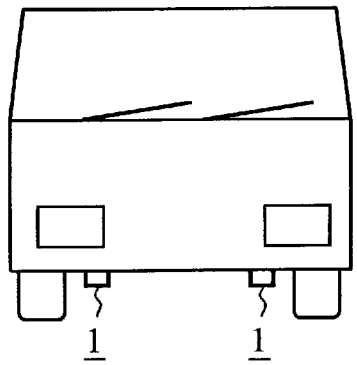
FIG. 29 is an explanatory drawing showing the placement of inclination angle measurement units included in an inclination angle measurement apparatus according to embodiment 15 of the present invention and mounted in a vehicle so that they are arranged along the width of the vehicle.

FIG. 29 is an explanatory drawing showing the placement of inclination angle measurement units included in an inclination angle measurement apparatus according to embodiment 15 of the present invention and mounted on a vehicle so that they are arranged in a line along the width of the vehicle.

As shown in FIG. 29, in the inclination angle measurement apparatus according to this embodiment 15, the plurality of inclination angle measurement units are arranged in a line along the width of the vehicle in addition to a plurality of inclination angle measurement units arranged in a line along the length of the vehicle so that the inclination angle measurement apparatus can measure an angle of side-to-side inclination of the vehicle with respect to a road surface. In this case, because a plurality of ultrasonic sensors are arranged in a line along the length of the vehicle, the inclination angle measurement apparatus can measure the angle of front-to-back inclination of the vehicle with respect to the road surface. Furthermore, because a plurality of other ultrasonic sensors are also arranged in a line along the width of the vehicle, the inclination angle measurement apparatus can measure the angle of side-to-side inclination of the vehicle with respect to the road surface and can also detect a roll of the vehicle.

Embodiment 16.

Figure 30:
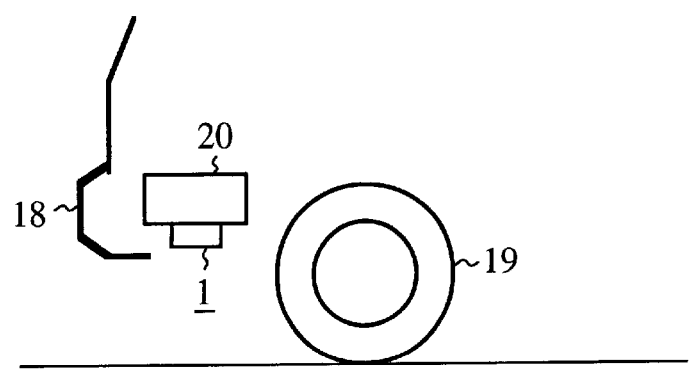
FIG. 30 is an explanatory drawing showing the placement of an inclination angle-measurement apparatus according to embodiment 16 of the present invention that is mounted on a vehicle.

FIG. 30 is an explanatory drawing showing the placement of an inclination angle measurement apparatus according to embodiment 16 of the present invention that is mounted on a vehicle. In the figure, reference numeral 18 denotes a front bumper, reference numeral 19 denotes a front wheel, and reference numeral 20 denotes a frame.

As shown in FIG. 30, the inclination angle measurement apparatus 1 is placed behind the front bumper 18 of the vehicle and on a lower surface of the frame 20 located in front of the front wheel 19. Rain, snow, mud, and so on are prevented from sticking to ultrasonic sensors included in the inclination angle measurement apparatus 1 because the bumper serves as a protection wall for protecting the inclination angle measurement apparatus 1 from them, and therefore measurement errors can be prevented from occurring. Furthermore, because the inclination angle measurement apparatus 1 can be protected from water, mud, and stones rolled up by wheels, it is made to be less prone to breakages and measurement errors can be prevented from occurring.

Embodiment 17.

Figure 31:
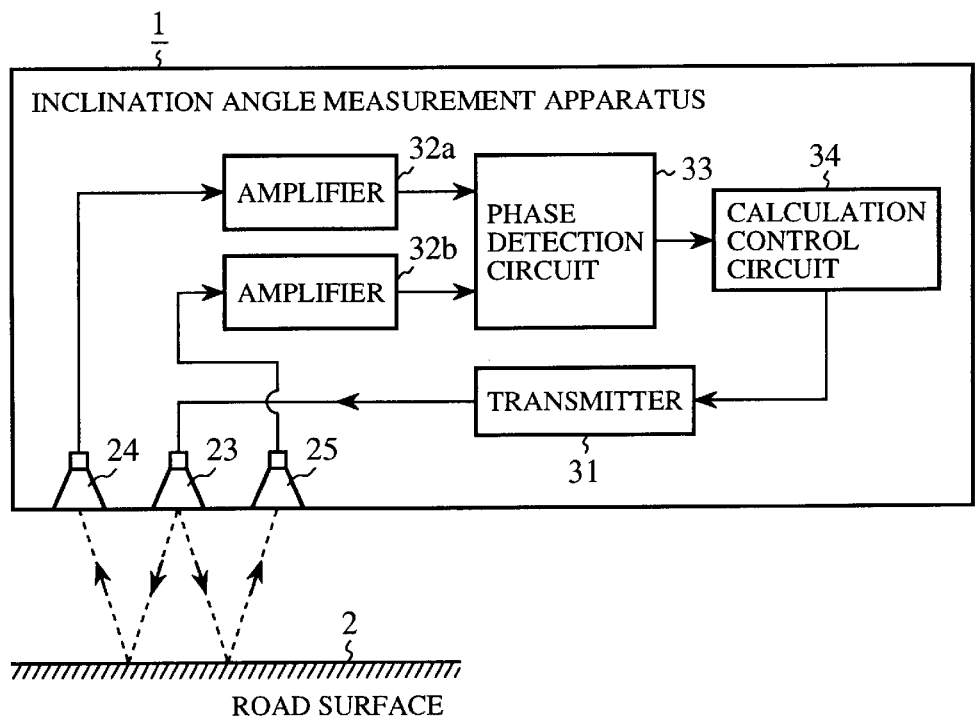
FIG. 31 is a block diagram showing the structure of an inclination angle measurement apparatus according to embodiment 17 of the present invention.

FIG. 31 is a block diagram showing the structure of an inclination angle measurement apparatus according to embodiment 17 of the present invention. In the figure, reference numeral 23 to 25 denote horn antennas each of which can function as a sensor by receiving an electromagnetic wave. Each of these horn antennas 23 to 25 can convert an electric fixed-frequency pulse train into an electric electromagnetic wave, and vice versa. In other words, each of these horn antennas 23 to 25 can send and receive an electromagnetic wave. In accordance with this embodiment 17, the first horn antenna 23 serves as an antenna for sending an electromagnetic wave toward a road surface 2, and each of the second and third horn antennas 24 and 25 serves as an antenna for receiving an electromagnetic wave reflected from the road surface 2. The first to third horn antennas 23 to 25 are arranged in a line along the length of a vehicle and are spaced at regular intervals.

In FIG. 31, reference numeral 31 denotes a transmitter for generating and delivering a fixed-frequency pulse train to the first horn antenna 23, reference numerals 32a and 32b denote amplifiers for amplifying fixed-frequency pulse trains into which electromagnetic waves received by the second and third horn antennas 24 and 25 are converted, respectively, reference numeral 33 denotes a phase synchronization detecting circuit for comparing the waveforms of the fixed-frequency pulse trains amplified by the amplifiers 32a and 32b with each other so as to generate a phase difference between the fixed-frequency pulse trains, and reference numeral 34 denotes a calculation control circuit (inclination angle calculating means) for calculating an angle of inclination of the vehicle with respect to the road surface 2 based on the phase difference from the phase synchronization detecting circuit 33, and for controlling the entire inclination angle measurement apparatus 1.

Next, a description will be made as to an operation of the inclination angle measurement apparatus according to embodiment 17 of the present invention. The transmitter 31 shown in FIG. 31 generates a fixed-frequency pulse train having a frequency of 10 GHz, for example, according to an instruction from the calculation control circuit 34 and delivers it to the first horn antenna 23. The first horn antenna 23 converts the fixed-frequency pulse train acquired from the transmitter 31 into an electromagnetic wave so as to send the electromagnetic wave toward the road surface 2.'

The electromagnetic wave hits the road surface 2 and is reflected from the road surface 2, and the second and third horn antennas 24 and 25 receive two electromagnetic waves reflected from the road surface 2 and generate electric fixed-frequency pulse signals having frequencies corresponding to the two received electromagnetic waves, respectively. The amplifiers 32a and 32b amplify the fixed-frequency pulse trains generated by the second and third horn antennas 24 and 25, respectively, and transmit them to the phase synchronization detecting circuit 33. The phase synchronization detecting circuit 33 compares the waveforms of the fixed-frequency pulse trains respectively amplified by the amplifiers 32a and 32b with each other. The reflected electromagnetic wave received by each of the second and third horn antennas 24 and 25 has inadequate energy and a waveform of small amplitude immediately after received. The phase synchronization detecting circuit 33 may not be able to recognize the waveforms of the two reflected electromagnetic waves immediately after the second and third horn antennas 24 and 25 start receiving the two reflected electromagnetic waves, respectively. Therefore, after the two reflected electromagnetic waves have adequate signal levels, the phase synchronization detecting circuit 33 compares the waveforms of the fixed-frequency pulse trains respectively amplified by the amplifiers 32a and 32b with each other.

In FIG. 31, reference numeral 31 denotes a transmitter for generating and delivering a fixed-frequency pulse train to the first horn antenna 23, reference numerals 32a and 32b denote amplifiers for amplifying fixed-frequency pulse trains into which electromagnetic waves received by the second and third horn antennas 24 and 25 are converted, respectively, reference numeral 33 denotes a phase synchronization detecting circuit for comparing the waveforms of the fixed-frequency pulse trains amplified by the amplifiers 32a and 32b with each other so as to generate a phase difference between the fixed-frequency pulse trains, and reference numeral 34 denotes a calculation control circuit (inclination angle calculating means) for calculating an angle of inclination of the vehicle with respect to the road surface 2 based on the phase difference from the phase synchronization detecting circuit 33, and for controlling the entire inclination angle measurement apparatus 1.

Next, a description will be made as to an operation of the inclination angle measurement apparatus according to embodiment 17 of the present invention. The transmitter 31 shown in FIG. 31 generates a fixed-frequency pulse train having a frequency of 10 GHz, for example, according to an instruction from the calculation control circuit 34 and delivers it to the first horn antenna 23. The first horn antenna 23 converts the fixed-frequency pulse train acquired from the transmitter 31 into an electromagnetic wave so as to send the electromagnetic wave toward the road surface 2.

The electromagnetic wave hits the road surface 2 and is reflected from the road surface 2, and the second and third horn antennas 24 and 25 receive two electromagnetic waves reflected from the road surface 2 and generate electric fixed-frequency pulse signals having frequencies corresponding to the two received electromagnetic waves, respectively. The amplifiers 32a and 32b amplify the fixed-frequency pulse trains generated by the second and third horn antennas 24 and 25, respectively, and transmit them to the phase synchronization detecting circuit 33. The phase synchronization detecting circuit 33 compares the waveforms of the fixed-frequency pulse trains respectively amplified by the amplifiers 32a and 32b with each other. The reflected electromagnetic wave received by each of the second and third horn antennas 24 and 25 has inadequate energy and a waveform of small amplitude immediately after received. The phase synchronization detecting circuit 33 may not be able to recognize the waveforms of the two reflected electromagnetic waves immediately after the second and third horn antennas 24 and 25 start receiving the two reflected electromagnetic waves, respectively. Therefore, after the two reflected electromagnetic waves have adequate signal levels, the phase synchronization detecting circuit 33 compares the waveforms of the fixed-frequency pulse trains respectively amplified by the amplifiers 32a and 2b with each other.

Because the second and third horn antennas 24 and 25 simultaneously receive the two electromagnetic waves reflected from the road surface 2 when the vehicle is parallel to the road surface 2, the two electromagnetic waves are in phase with each other. In contrast, when the vehicle's front side goes down toward the road surface 2, that is, when the vehicle's front side is inclined toward the road surface 2, the second horn antenna 24 receives the reflected electromagnetic wave earlier than the horn antenna 25 receives the reflected electromagnetic wave. In other words, the phase of the electromagnetic wave received by the second horn antenna 24 leads the phase of the electromagnetic wave received by the third horn antenna 25. Oppositely, when the vehicle's rear side goes down toward the road surface 2, that is, when the vehicle's rear side is inclined toward the road surface 2, the second horn antenna 24 receives the reflected electromagnetic wave later than the third horn antenna 25 receives the reflected electromagnetic wave. In other words, the phase of the electromagnetic wave received by the second horn antenna 24 lags the phase of the electromagnetic wave received by the third horn antenna 25. The phase synchronization detecting circuit 33 determines the phase difference between the phases of the two received electromagnetic waves, converts this phase difference into an equivalent analog value, and delivers the analog value to the calculation control circuit 34. The calculation control circuit 34 calculates the angle of inclination of the vehicle with respect to the road surface 2 from the phase difference, the propagation velocity of the electromagnetic wave sent by the first horn antenna 23, and the distance between the second horn antenna 24 and the third horn antenna 25.

Furthermore, in accordance with this embodiment 17, when the first horn antenna 23 generates and sends an electromagnetic wave of a frequency of 10 GHz toward the road surface 2, for example, the electromagnetic wave has a wavelength of 30 mm that is longer than those of ultrasonic waves. In this case, the inclination angle measurement apparatus can measure the angle of inclination of the vehicle with respect to the road surface 2 with an enlarged dynamic range of angles of inclination and without being under the influence of irregularities of the road surface 2.

In addition, because electromagnetic waves have a large propagation velocity, the inclination angle measurement apparatus according to embodiment 17 is not under the influence of travel of the vehicle. Furthermore, the inclination angle measurement apparatus according to embodiment 17 is not under the influence of wind, rain and snow even when the vehicle is traveling. In addition, while the inclination angle measurement apparatus according to either of above-mentioned embodiments that uses ultrasonic waves is under the influence of temperature, the inclination angle measurement apparatus according to this embodiment 17 is not under the influence of temperature.

As previously mentioned, the inclination angle measurement apparatus according to embodiment 17 of the present invention has a structure similar to that of above-mentioned embodiment 1, in which electromagnetic waves are used to measure an angle of inclination of a vehicle with respect to a road surface such as a road surface. As an alternative, the inclination angle measurement apparatus according to embodiment 17 of the present invention can have a structure similar to that of above-mentioned embodiment 2, 3, 4 or 5, in which electromagnetic waves are used to measure an angle of inclination of a vehicle with respect to a road surface such as a road surface.

Embodiment 18.

Figure 32:
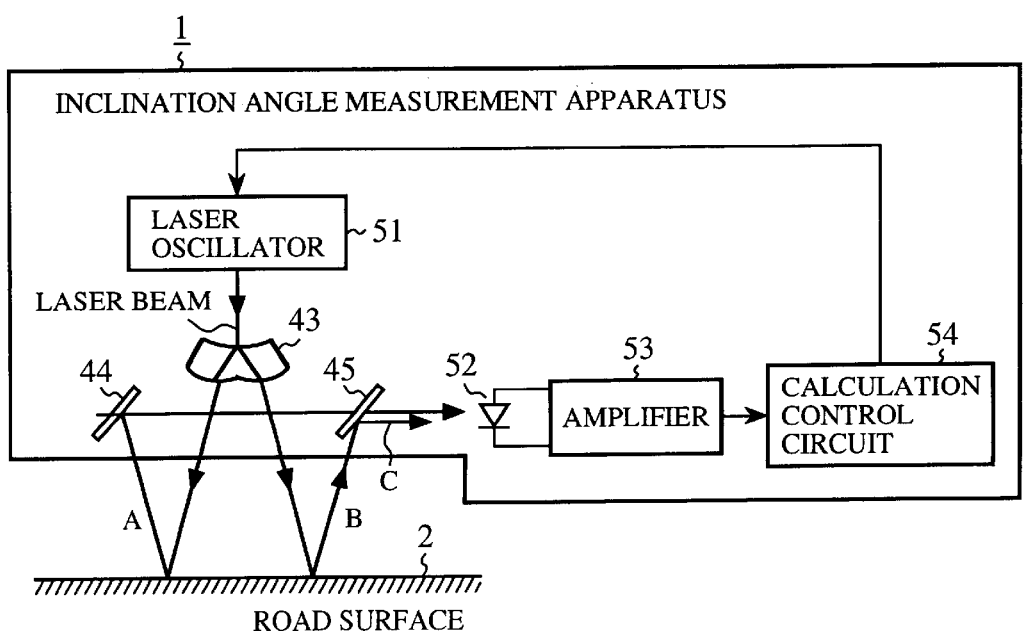
FIG. 32 is a block diagram showing the structure of an inclination angle measurement apparatus according to embodiment 18 of the present invention.

FIG. 32 is a block diagram showing the structure of an inclination angle measurement apparatus according to embodiment 18 of the present invention. In the figure, reference numeral 43 denotes a prism for dividing a laser beam (lightwave) incident thereon into two laser beams, reference numeral 44 denotes a reflector, and reference numeral 45 denotes a half mirror. The prism 43, the reflector 44, and the half mirror 45 are arranged in a line along the length of a vehicle and are spaced at regular intervals.

In FIG. 32, reference numeral 51 denotes a laser oscillator for generating and sending a laser beam of a fixed frequency to the prism 43, reference numeral 52 denotes a light receiving element (sensor) for receiving two laser beams reflected from a road surface 2 and respectively reflected from the reflector 44 and the half mirror 45, and for converting the laser beams that interfere with each other into an electric signal having an amplitude corresponding to the luminance of the received laser beams, reference numeral 53 denotes an amplifier for amplifying the electric signal obtained by the light receiving element 52, and reference numeral 54 denotes a calculation control circuit (inclination angle calculating means) for calculating an angle of inclination of the vehicle with respect to the road surface 2 based on the electric signal amplified by the amplifier 53, and for controlling the entire inclination angle measurement apparatus 1.

Next, a description will be made as to an operation of the inclination angle measurement apparatus according to embodiment 18 of the present invention. The laser oscillator 51 shown in FIG. 32 generates a laser beam of a fixed frequency according to an instruction from the calculation control circuit 54, and sends the laser beam to the prism 43. The prism 43 divides the laser beam incident thereon from the laser oscillator 51 into two laser beams, and sends the two laser beams toward the road surface 2.

The two laser beams from the prism 43 hit the road surface 2 and are reflected from the road surface 2. The two laser beams are further reflected from the reflector 44 and the half mirror 45, respectively. After that, one of the two laser beams from the reflector 44 passes through the half mirror 45, and the two laser beams then travel along the same optical path designated by C and enter the light receiving element 52. The two laser beams incident upon the light receiving element 52 have a phase difference corresponding to the difference between the lengths of optical paths A and B along which the two laser beams from the prism 43 travel, respectively. As a result, interference occurs at the light receiving element 52. For example, when the difference between the lengths of the optical paths A and B is an integral multiple of the wavelength of the laser beams, a bright interference fringe is incident upon the light receiving element 52. In contrast, if the difference between the lengths of the optical paths A and B is an integral multiple and one-half of the wavelength of the laser beams, a dark interference fringe is incident upon the light receiving element 52.

The light receiving element 52 converts the laser beams incident thereupon into an electric signal having an amplitude corresponding to the total luminance of the laser beams, and the amplifier 53 amplifies the electric signal obtained by the light receiving element 52. The calculation control circuit 54 then calculates the angle of inclination of the vehicle with respect to the road surface from the electric signal amplified by the amplifier 53, the propagation velocity of the laser beams, and the distance between the reflector 44 and the half mirror 45.

As mentioned above, in accordance with this embodiment 18, the inclination angle measurement apparatus can accurately measure an angle of inclination of a vehicle with respect to a road surface based on a phase difference between the phases of received laser beams by using the prism 43, the reflector 44, and the half mirror 45.

Furthermore, in accordance with this embodiment 18, because the inclination angle measurement apparatus uses a laser beam having a short wavelength, the inclination angle measurement apparatus can measure the angle of inclination of the vehicle with a high resolution.

In addition, the inclination angle measurement apparatus according to embodiment 18 is not under the influence of a wind caused by travel of the vehicle. Furthermore, while the inclination angle measurement apparatus according to either of above-mentioned embodiments 1 to 16 that uses ultrasonic waves is under the influence of temperature, the inclination angle measurement apparatus according to this embodiment 18 is not under the influence of temperature.

As previously mentioned, the inclination angle measurement apparatus according to embodiment 18 of the present invention has a structure similar to that of above-mentioned embodiment 1, in which laser beams are used to measure an angle of inclination of a vehicle with respect to a road surface such as a road surface. As an alternative, the inclination angle measurement apparatus according to embodiment 18 of the present invention can have a structure similar to that of above-mentioned embodiment 2, 3, 4 or 5, in which laser beams are used to measure an angle of inclination of a vehicle with respect to a road surface such as a road surface.

Embodiment 19.

Figure 33:
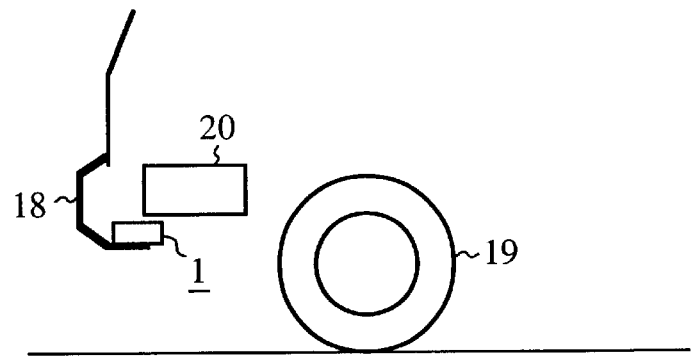
FIG. 33 is an explanatory drawing showing the placement of an inclination angle measurement apparatus according to embodiment 19 of the present invention, which is mounted on a vehicle.

FIG. 33 is an explanatory drawing showing the placement of an inclination angle measurement apparatus 1 according to embodiment 19 of the present invention, which is mounted on a vehicle. The inclination angle measurement apparatus 1 according to embodiment 16, as shown in FIG. 30, is mounted on a lower surface of a frame 20 behind a front bumper 18 of the vehicle and in front of a front wheel 19. In contrast, the inclination angle measurement apparatus 1 according to this embodiment 19 is placed within the inside of the front bumper 18 of the vehicle. In this case, the inclination angle measurement apparatus 1 can be secured to either the front bumper 18 or the frame 20.

In accordance with this embodiment 19, it is preferable that the whole of the inclination angle measurement apparatus 1 is contained within the inside of the front bumper 18. However, a rear portion of the inclination angle measurement apparatus 1 can backwardly project from the inside of the front bumper 18. Even in this case, rain, snow, mud, and so on are prevented from sticking to ultrasonic sensors included in the inclination angle measurement apparatus. Furthermore, because the flow of air between the inclination angle measurement apparatus 1 and the road surface is rectified by the bumper, the measurement of the angle of inclination of the vehicle is resistant to disorders of the flow of air and measurement errors can be reduced.

Embodiment 20.

Figure 34:
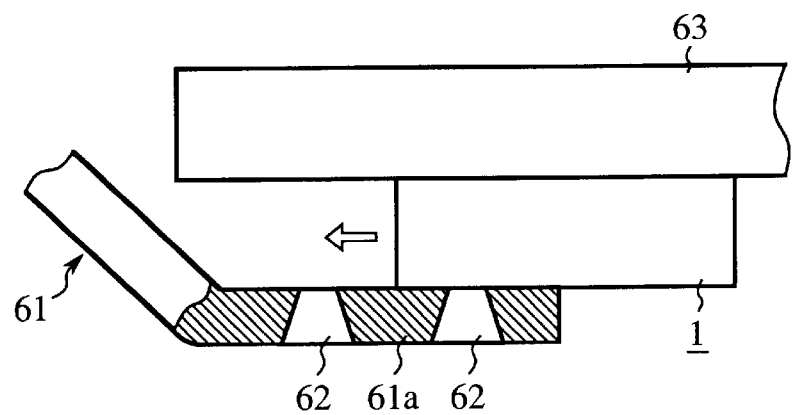
FIG. 34 is an explanatory drawing showing a process of placing an inclination angle measurement apparatus according to embodiment 20 of the present invention in a vehicle.
Figure 35:
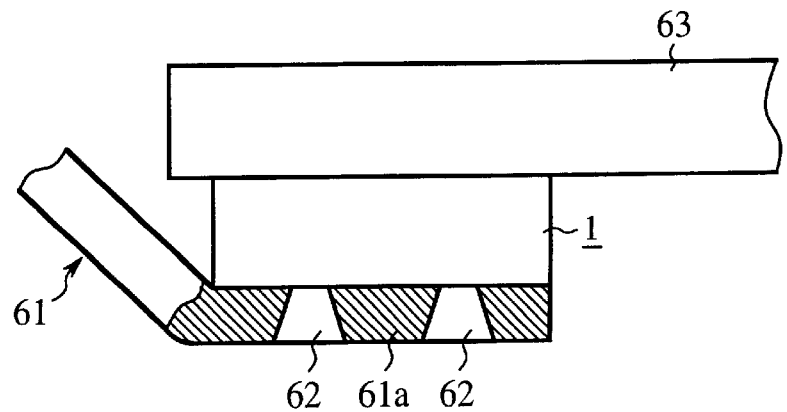
FIG. 35 is an explanatory drawing showing the placement of the inclination angle measurement apparatus according to embodiment 20.

FIG. 34 is an explanatory drawing showing a process of placing an inclination angle measurement apparatus 1 according to embodiment 20 of the present invention in a vehicle, and FIG. 35 is an explanatory drawing showing the placement of the inclination angle measurement apparatus 1. In accordance with this embodiment 20, a front bumper 61 includes a base plate portion 61a having horn-shaped holes 62 each for directing an ultrasonic wave sent by a corresponding ultrasonic sensor toward a road surface, and the whole of the inclination angle measurement apparatus 1 is placed on the base plate portion 61a of the front bumper 61.

In accordance with to this embodiment 20, because the whole of the inclination angle measurement apparatus 1 is covered by the front bumper 61, rain, snow, mud, and so on are prevented from sticking to ultrasonic sensors included in the inclination angle measurement apparatus 1 and therefore measurement errors can be reduced. In addition, because horn-shaped holes 62 are formed in the front bumper 61, the ultrasonic wave sent by each ultrasonic sensor can have directivity and therefore the measurement accuracy can be improved.

Embodiment 21.

Figure 36:
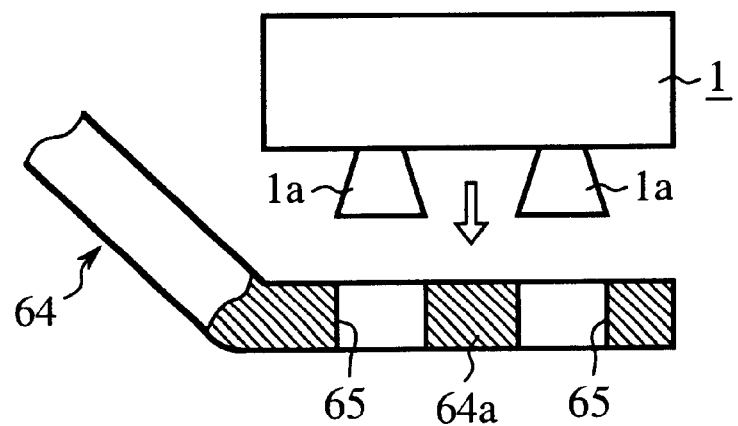
FIG. 36 is an explanatory drawing showing a process of placing an inclination angle measurement apparatus according to embodiment 21 of the present invention in a vehicle.
Figure 37:
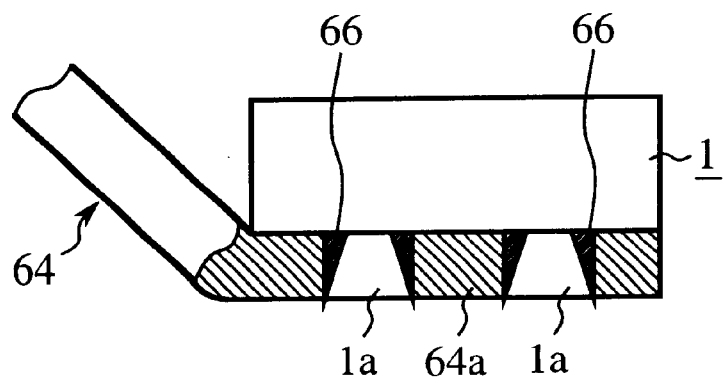
FIG. 37 is an explanatory drawing showing the placement of the inclination angle measurement apparatus according to embodiment 21.

FIG. 36 is an explanatory drawing showing a process of placing an inclination angle measurement apparatus 1 according to embodiment 21 of the present invention in a vehicle, and FIG. 37 is an explanatory drawing showing the placement of the inclination angle measurement apparatus 1. The inclination angle measurement apparatus 1 according to this embodiment 21 is provided with horn-shaped projecting portions 1a respectively corresponding to ultrasonic sensors included therein. A front bumper 64 includes a base plate portion 64a having holes 65 each formed for accommodating a corresponding horn-shaped projecting portion 1a of the inclination angle measurement apparatus 1. When the inclination angle measurement apparatus 1 is mounted in the inside of the front bumper 64, the whole of the inclination angle measurement apparatus 1 is attached to the front bumper 64 from an upper side of the base plate portion 64a of the front bumper 64. A seal member or vibration isolation member 66 can be disposed between the outer surface of each horn-shaped projecting portion 1a and the inner surface of a corresponding hole 65.

In accordance with this embodiment 21, because holes 65 each for accommodating a corresponding horn-shaped projecting portion 1a of the inclination angle measurement apparatus 1 are formed in the front bumper 64, the inclination angle measurement apparatus 1 provided with horn-shaped projecting portions 1a can be placed in the inside of the front bumper 64 and therefore the same advantage as offered by embodiment 20 can be provided. In a variant of this embodiment, holes 65 each for accommodating a corresponding horn-shaped projecting portion 1a of the inclination angle measurement apparatus 1 can be formed in a rear bumper rather than the front bumper 64.

Many widely different embodiments of the present invention may be constructed without departing from the spirit and scope of the present invention. It should be understood that the present invention is not limited to the specific embodiments described in the specification, except as defined in the appended claims.

What is claimed is:

1. An inclination angle measurement apparatus comprising:

a sending/receiving means for sending a wave toward a road surface and for receiving a wave reflected from said road surface at two discrete locations; and an inclination angle calculating means for calculating an angle of inclination of a vehicle with respect to said road surface based on a phase difference between the reflected wave a received at said two discrete locations, wherein said wave sent by said sending/receiving means is an electromagnetic wave, and said reflected wave is an electromagnetic wave reflected from said road surface.

2. An inclination angle measurement apparatus comprising:

a sending/receiving means for sending a wave toward a road surface and for receiving a wave reflected from said road surface at two discrete locations; and an inclination angle calculating means for calculating an angle of inclination of a vehicle with respect to said road surface based on a phase difference between the reflected wave as received at said two discrete locations, wherein said wave sent by said sending/receiving means is a lightwave, and said reflected waves is a lightwave reflected from said road surface.

3. An inclination angle measurement apparatus comprising:

a sending/receiving means for sending a wave toward a road surface and for receiving a wave reflected from said road surface at two discrete locations; and an inclination angle calculating means for calculating an angle of inclination of a vehicle with respect to said road surface based on a phase difference between the reflected wave as received at said two discrete locations, wherein said wave sent by said sending/receiving means is a first ultrasonic wave, and said two reflected wave is a second ultrasonic wave reflected from said road surface, and wherein said sending/receiving means includes a first ultrasonic sensor for sending an ultrasonic wave toward said road surface and second and third ultrasonic sensors disposed at said two discrete locations at an equal distance from said first ultrasonic sensor, for receiving said second ultrasonic wave reflected from said road surface, respectively, so as to form an isosceles triangle with the first ultrasonic sensor as a vertex, and said inclination angle calculating means calculates the angle of inclination of said vehicle with respect to said road surface based on a phase difference between the detected phases of the reflected wave as received by said second and third ultrasonic sensors.

4. An inclination angle measurement apparatus comprising:

a sending/receiving means for sending a wave toward a road surface and for receiving two waves reflected from said road surface; and an inclination angle calculating means for calculating an angle of inclination of a vehicle with respect to said road surface based on a phase difference between phases of the two reflected waves, wherein said wave sent by said sending/receiving means is an ultrasonic wave, and said two reflected waves are two ultrasonic waves reflected from said road surface, and, wherein said sending/receiving means includes a first ultrasonic sensor for sending an ultrasonic wave toward said road surface and second and third ultrasonic sensors disposed at an equal distance from said first ultrasonic sensor, each for sending an ultrasonic wave toward said road surface and then receiving an ultrasonic wave reflected from said road surface, and said inclination angle calculating means determines a first phase difference between phases of two ultrasonic waves sent by said first ultrasonic sensor and received by said second and third ultrasonic sensors, also determines a second phase difference between a phase of an ultrasonic wave sent by said second ultrasonic sensor and received by said third ultrasonic sensor and a phase of an ultrasonic wave sent by said third ultrasonic sensor and received by said second ultrasonic sensor, and calculates the angle of inclination of said vehicle with respect to said road surface according to a phase difference that is obtained by correcting the first phase difference using the second phase difference.

5. An inclination angle measurement apparatus comprising:

a sending/receiving means from sending a wave toward a road surface and for receiving two waves reflected from said road surface; and an inclination angle calculating means for calculating an angle of inclination of a vehicle with respect to said road surface based on a phase difference between phases of the two reflected waves, wherein said wave sent by said sending/receiving means is first ultrasonic wave, and said two reflected waves are two ultrasonic waves reflected from said road surface, and wherein said sending/receiving means includes a first ultrasonic sensor for sending an ultrasonic wave toward said road surface and then receiving an ultrasonic wave reflected from said road surface, and a second ultrasonic sensor disposed at a distance from said first ultrasonic sensor that is much smaller than a distance to said road surface, for sending an ultrasonic wave in phase with the ultrasonic wave sent by said first ultrasonic sensor toward said road surface and then receiving an ultrasonic wave reflected from said road surface, and said inclination angle calculating means calculates the angle of inclination of said vehicle with respect to said road surface based on a phase difference between phases of the two reflected ultrasonic waves received by said first and second ultrasonic sensors.

6. An inclination angle measurement apparatus comprising:

a sending/receiving means for sending a wave toward a road surface and for receiving two waves reflected from said road surface; and an inclination angle calculating means for calculating an angle of inclination of a vehicle with respect to said road surface based on a phase difference between phases of the two reflected waves, wherein said wave sent by said sending/receiving means is an ultrasonic wave, and said two reflected waves are two ultrasonic waves reflected from said road surface, and wherein said sending/receiving means includes first and second ultrasonic sensors each for sending an ultrasonic wave toward said road surface, a third ultrasonic sensor for receiving the ultrasonic wave sent by said first ultrasonic sensor and reflected from said road surface, a fourth ultrasonic sensor disposed at a distance from said second ultrasonic sensor that is equal to a distance between said first and third ultrasonic sensors, for receiving the ultrasonic wave sent by said second ultrasonic sensor and reflected from said road surface, and said inclination angle calculating means calculates the angle of inclination of said vehicle with respect to said road surface based on a phase difference between phases of the two reflected ultrasonic waves received by said third and fourth ultrasonic sensors.

7. The inclination angle measurement apparatus according to claim 6, further comprising a means for enabling said inclination angle measurement apparatus while said vehicle is traveling at a speed that falls within a predetermined range.

8. The inclination angle measurement apparatus according to claim 3, wherein each ultrasonic wave that is sent toward said road surface by said sending/receiving means has a frequency of about 20 kHz.

9. An inclination angle measurement apparatus comprising:

a sending/receiving means for sending a wave toward a road surface and for receiving two waves reflected from said road surface; and an inclination angle calculating means for calculating an angle of inclination of a vehicle with respect to said road surface based on a phase difference between phases of the two reflected waves, wherein said wave sent by said sending/receiving means is an ultrasonic wave, and said two reflected waves are two ultrasonic waves reflected from said road surface, and wherein said sending/receiving means includes a means for switching between two or more different frequencies for each ultrasonic wave that is sent toward said road surface thereby when each received ultrasonic wave has a small amplitude.

10. The inclination angle measurement apparatus according to claim 3, wherein said sending/receiving means intermittently sends each ultrasonic wave toward said road surface.

11. An inclination angle measurement apparatus comprising:

a sending/receiving means for sending a wave toward a road surface and for receiving two waves reflected from said road surface;

received ultrasonic wave, a clock terminal for receiving an electric signal acquired from another received ultrasonic wave, and an output terminal for outputting a signal representing a direction in which said inclination angle measurement apparatus is inclined, wherein said wave sent by said sending/receiving means is an ultrasonic wave, and said two reflected waves are ultrasonic waves reflected from said road surface.

12. The inclination angle measurement apparatus according to claim 5, further comprising a means for enabling said inclination angle measurement apparatus while said vehicle is traveling at a speed that falls within a predetermined range.

13. An inclination angle measurement apparatus comprising:
   a sending/receiving means for sending a wave toward a road surface and for receiving two waves reflected from said road surface;
   an inclination angle calculating means for calculating an angle of inclination of a vehicle with respect to said road surface based on a phase difference between phases of the two reflected waves; and
   a means for enabling said inclination angle measurement apparatus while said vehicle is traveling at a speed that falls within a predetermined range.

14. The inclination angle measurement apparatus according to claim 3, wherein said plurality of ultrasonic sensors are arranged along a length of said vehicle.

15. The inclination angle measurement apparatus according to claim 4, further comprising a means for enabling said inclination angle measurement apparatus while said vehicle is traveling at a speed that falls within a predetermined range.

16. The inclination angle measurement apparatus according to claim 3, further comprising a means for enabling said inclination angle measurement apparatus while said vehicle is traveling at a speed that falls within a predetermined range.

17. The inclination angle measurement apparatus according to claim 3, wherein said second and third ultrasonic sensors are disposed at a distance from said first ultrasonic sensor that is much smaller than a distance to said road surface and send ultrasonic waves with the same phase as the ultrasonic wave sent by said first ultrasonic sensor toward said road surface and then receiving an ultrasonic wave reflected from said road surface.

18. The inclination angle measurement apparatus according to claim 3, wherein said inclination angle measurement apparatus is placed behind a front bumper of said vehicle and in front of a front wheel.

19. The inclination angle measurement apparatus according to claim 3, wherein at the same time when said phase difference is determined, a second phase difference between a phase of an ultrasonic wave sent by said second ultrasonic sensor and received by said third ultrasonic sensor and a phase of an ultrasonic wave sent by said third ultrasonic sensor and received by said second ultrasonic sensor, is also determined and the angle of inclination of said vehicle is calculated with respect to said road surface according to a third phase difference that is obtained by correcting the first phase difference using the second phase difference.

20. The inclination angle measurement apparatus according claim 13, further comprising a horn-shaped member for directing the ultrasonic wave sent by said sending/receiving moans toward said road surface.

21. The inclination angle measurement apparatus according to claim 3, further comprising a horn-shaped member for directing the ultrasonic wave sent by said sending/receiving means toward said road surface.

22. The inclination angle measurement apparatus according claim 6, further comprising a horn-shaped member for directing the ultrasonic wave sent by said sending/receiving means toward said road surface.

23. The inclination angle measurement apparatus according to claim 13, wherein said sending/receiving means and said inclination angle calculating means are respectively included in a plurality of inclination angle measurement means disposed at different locations of a vehicle, and further comprising a means for calculating an average of angles of inclination of said vehicle calculated by said plurality of inclination angle measurement means.

24. The inclination angle measurement apparatus according to claim 6, wherein each-ultrasonic wave that is sent toward said road surface by said sending/receiving means has a frequency of about 20 kHz.

25. The inclination angle measurement apparatus according to claim 6, wherein said sending/receiving means intermittently sends each ultrasonic wave toward said road surface.

26. The inclination angle measurement apparatus according to claim 4, wherein said plurality of ultrasonic sensors are arranged along a length of said vehicle.

27. The inclination angle measurement apparatus according to claim 5, wherein said plurality of ultrasonic sensors are arranged along a length of said vehicle.

28. The inclination angle measurement apparatus according to claim 6, wherein said plurality of ultrasonic sensors are arranged along a length of said vehicle.

29. The inclination angle measurement apparatus according to claim 4, wherein said inclination angle measurement apparatus is placed behind a front bumper of said vehicle and in front of a front wheel.

30. The inclination angle measurement apparatus according to claim 5, wherein said inclination angle measurement apparatus is placed behind a front bumper of said vehicle and in front of a front wheel.

31. The inclination angle measurement apparatus according to claim 6, wherein said inclination angle measurement apparatus is placed behind a front bumper of said vehicle and in front of a front wheel.

32. The inclination angle measurement apparatus according to claim 13, wherein said inclination angle measurement apparatus is placed behind a front bumper of said vehicle and in front of a front wheel.

33. The inclination angle measurement apparatus according claim 4, further comprising a horn-shaped member for directing the ultrasonic wave sent by said sending/receiving means toward said road surface.

34. The inclination angle measurement apparatus according claim 5, further comprising a horn-shaped member for directing the ultrasonic wave sent by said sending/receiving means toward said road surface.

* * * * *